US012679626B2

(12) United States Patent
Cutter et al.

(10) Patent No.: US 12,679,626 B2
(45) Date of Patent: Jul. 14, 2026

(54) SYSTEMS AND TECHNIQUES FOR ENHANCING PACKAGED BEVERAGES

(71) Applicant: Beverage Booster Inc., Boulder, CO (US)

(72) Inventors: Matthew Alex Cutter, Boulder, CO (US); Maxiliaan Gulden, Boulder, CO (US); Daniel Joseph Bodenstein, Boulder, CO (US); Zachary Speer, Boulder, CO (US); Ryan Michael Welsh Snow, Boulder, CO (US); Benjamin James Farr, Boulder, CO (US)

(73) Assignee: Beverage Booster Inc., Boulder, CO (US)

( * ) Notice: Subject to any disclaimer, the term of this patent is extended or adjusted under 35 U.S.C. 154(b) by 0 days.

(21) Appl. No.: 19/048,463

(22) Filed: Feb. 7, 2025

(65) Prior Publication Data

US 2025/0256905 A1 Aug. 14, 2025

Related U.S. Application Data

(60) Provisional application No. 63/650,716, filed on May 22, 2024, provisional application No. 63/552,003, filed on Feb. 9, 2024.

(51) Int. Cl.
B65D 81/32 (2006.01)
A23L 2/56 (2006.01)
(Continued)

(52) U.S. Cl.
CPC ............ B65D 81/3216 (2013.01); A23L 2/56 (2013.01); B65D 85/72 (2013.01); C12C 5/026 (2013.01)

(58) Field of Classification Search
None
See application file for complete search history.

(56) References Cited

U.S. PATENT DOCUMENTS

| 3,305,368 | A | 2/1967 | Bourelle |
| 4,627,986 | A | 12/1986 | Bardsley et al. |

(Continued)

FOREIGN PATENT DOCUMENTS

| CN | 201542945 U | 8/2010 | |
| EP | 1704803 A1 * | 9/2006 | .......... A47J 31/0668 |

(Continued)

OTHER PUBLICATIONS

Hamilton Company "Needle Technical Reference" Sep. 2023, Hamilton Reference Guide Syringes & Needles, p. 119.

(Continued)

*Primary Examiner* — Erik Kashnikow
*Assistant Examiner* — Thanh H Nguyen

(57) ABSTRACT

Systems and methods for releasing one or more non-gaseous remediating components into a packaged beverage upon opening of the packaged beverage are provided herein. For example, a cartridge includes a cap that is releasably secured to a top end of a cylindrical body. The cylindrical body may include an inner chamber and an outer chamber. The outer chamber may fill with dissolved gas when the outer chamber reaches a pressure equilibrium with the packaged beverage. The cap may include a pinhole orifice configured to restrict fluid flow between the outer chamber and an environment external to the cartridge such that when the packaged beverage is opened, the pinhole orifice restricts the gas within the outer chamber from flowing to the external environment, thereby causing the cap to decouple from the (Continued)

top end of the cylindrical body and release the remediating components housed in the inner chamber into the packaged beverage.

20 Claims, 25 Drawing Sheets

(51) Int. Cl.
 B65D 85/72 (2006.01)
 C12C 5/02 (2006.01)

(56) References Cited

U.S. PATENT DOCUMENTS

| | | | |
|---|---|---|---|
| 4,832,968 | A | 5/1989 | Forage et al. |
| 5,714,186 | A | 2/1998 | Nash et al. |
| 5,780,083 | A | 7/1998 | Wright et al. |
| 6,116,445 | A | 9/2000 | Ikemori et al. |
| 6,620,444 | B1 | 9/2003 | Reichinger |
| 8,007,880 | B2 | 8/2011 | Ullmann |
| 10,557,583 | B2 | 2/2020 | Magargal et al. |
| 2001/0001196 | A1 | 5/2001 | Hawthorne |
| 2002/0155199 | A1 | 10/2002 | Heide et al. |
| 2003/0111476 | A1 | 6/2003 | Serio, Jr. |
| 2007/0062375 | A1* | 3/2007 | Liverani ............. B65D 85/8043 |
| | | | 99/279 |
| 2007/0199838 | A1 | 8/2007 | Oh et al. |
| 2008/0245801 | A1 | 10/2008 | Ullmann et al. |
| 2008/0257845 | A1 | 10/2008 | Rossi |
| 2013/0243911 | A1* | 9/2013 | Abegglen ............... A47J 31/22 |
| | | | 426/115 |
| 2015/0110928 | A1 | 4/2015 | Kihnke |
| 2017/0297785 | A1 | 10/2017 | Maruyama et al. |
| 2017/0354169 | A1* | 12/2017 | Van De Sluis ........... A23L 2/54 |
| 2019/0292005 | A1 | 9/2019 | Miller et al. |
| 2023/0312196 | A1 | 10/2023 | Downing et al. |

FOREIGN PATENT DOCUMENTS

| | | | |
|---|---|---|---|
| EP | 2711311 A1 | 3/2014 | |
| FR | 2947442 A3 * | 1/2011 | ........ B65D 85/8064 |
| WO | 2020180984 A1 | 9/2020 | |
| WO | 2023218446 A1 | 11/2023 | |

OTHER PUBLICATIONS

International Search Report and Written Opinion for PCT/US2025/015052 mailed Jul. 15, 2025, Authorized Officer: Shane Thomas, 32 pages.
Precision IBC "Product Catalog" Oct. 2017, p. 18.

* cited by examiner

SEE FIG.12B

1200A

104

172

174

170 d$_{s2}$

1200B 170          170

170

170 d$_{s1}$          d$_{s1}$          d$_{s1}$

134

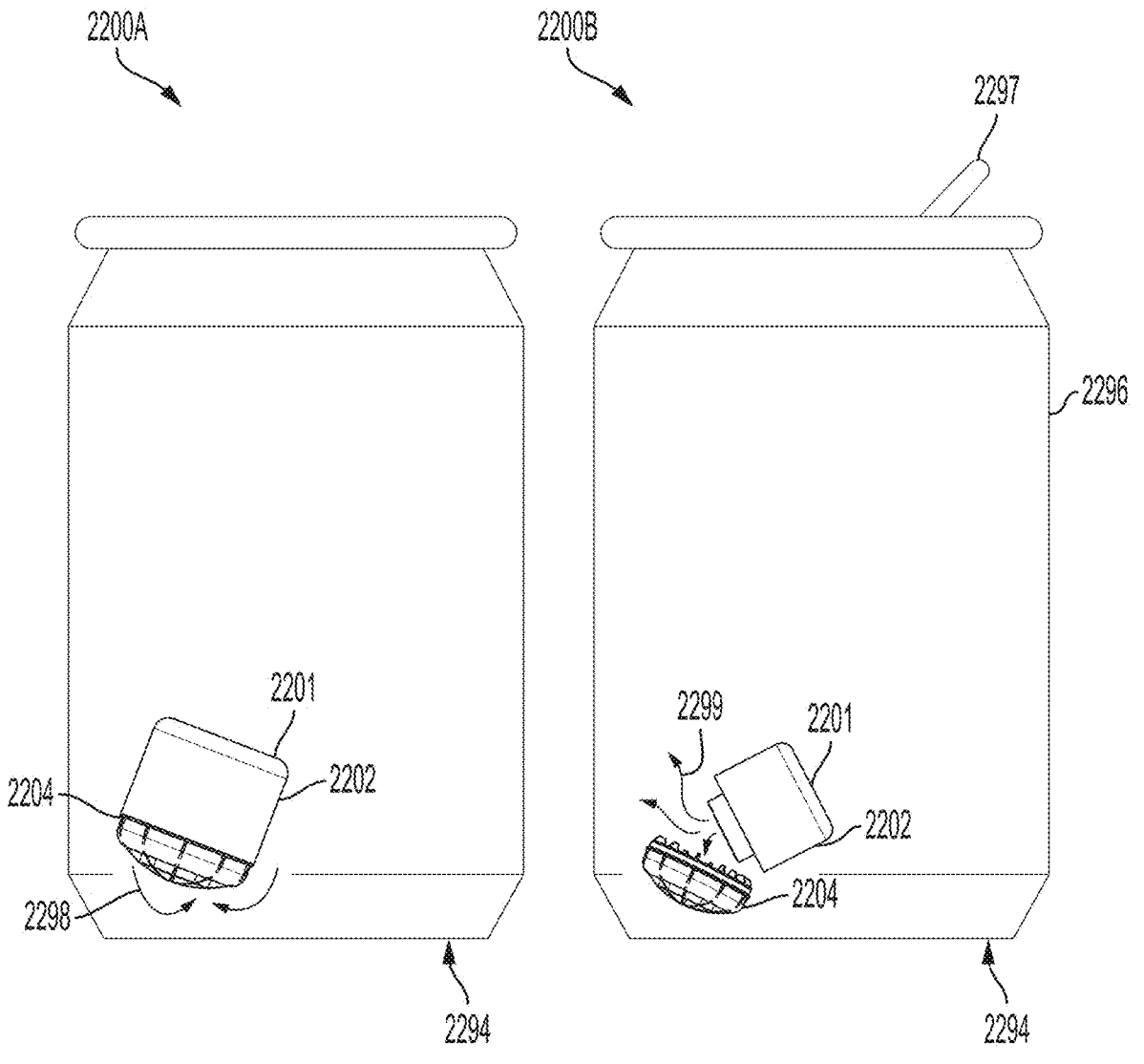
FIG. 22A                    FIG. 22B

CO2 Volume Chart

2300

Equilibrium PSI

| Temperature | 1 | 2 | 3 | 4 | 5 | 6 | 7 | 8 | 9 |
|---|---|---|---|---|---|---|---|---|---|
| 30F | 1.82 | 1.92 | 2.03 | 2.14 | 2.23 | 2.36 | 2.48 | 2.60 | 2.70 |
| 31F | 1.78 | 1.88 | 2.00 | 2.10 | 2.20 | 2.31 | 2.42 | 2.54 | 2.65 |
| 32F | 1.75 | 1.85 | 1.95 | 2.05 | 2.15 | 2.27 | 2.38 | 2.48 | 2.59 |
| 33F | 1.71 | 1.81 | 1.91 | 2.01 | 2.10 | 2.23 | 2.33 | 2.43 | 2.53 |
| 34F | 1.68 | 1.78 | 1.86 | 1.97 | 2.06 | 2.18 | 2.28 | 2.38 | 2.48 |
| 35F | 1.63 | 1.73 | 1.83 | 1.93 | 2.02 | 2.14 | 2.24 | 2.34 | 2.43 |
| 36F | 1.60 | 1.69 | 1.79 | 1.88 | 1.98 | 2.09 | 2.19 | 2.29 | 2.38 |
| 37F | 1.55 | 1.65 | 1.74 | 1.84 | 1.94 | 2.04 | 2.14 | 2.24 | 2.33 |
| 38F | 1.52 | 1.61 | 1.71 | 1.80 | 1.90 | 2.00 | 2.10 | 2.20 | 2.29 |
| 39F | 1.49 | 1.58 | 1.67 | 1.77 | 1.86 | 1.96 | 2.06 | 2.15 | 2.25 |
| 40F | 1.47 | 1.56 | 1.65 | 1.74 | 1.83 | 1.92 | 2.01 | 1.10 | 2.20 |
| 41F | 1.43 | 1.52 | 1.61 | 1.70 | 1.79 | 1.88 | 1.97 | 2.06 | 2.17 |
| 42F | 1.39 | 1.48 | 1.57 | 1.66 | 1.75 | 1.85 | 1.94 | 2.02 | 2.12 |
| 43F | 1.37 | 1.46 | 1.54 | 1.63 | 1.72 | 1.81 | 1.90 | 1.99 | 2.08 |
| 44F | 1.35 | 1.43 | 1.52 | 1.60 | 1.69 | 1.78 | 1.87 | 1.95 | 2.04 |
| 45F | 1.32 | 1.41 | 1.49 | 1.58 | 1.66 | 1.75 | 1.84 | 1.91 | 2.00 |
| 46F | 1.28 | 1.37 | 1.45 | 1.54 | 1.62 | 1.71 | 1.80 | 1.88 | 1.96 |
| 47F | 1.26 | 1.34 | 1.42 | 1.51 | 1.59 | 1.68 | 1.76 | 1.84 | 1.92 |
| 48F | 1.23 | 1.31 | 1.39 | 1.48 | 1.56 | 1.65 | 1.73 | 1.81 | 1.89 |
| 49F | 1.21 | 1.29 | 1.37 | 1.45 | 1.53 | 1.62 | 1.70 | 1.79 | 1.86 |
| 50F | 1.18 | 1.26 | 1.34 | 1.42 | 1.50 | 1.59 | 1.66 | 1.74 | 1.82 |
| 51F | 1.18 | 1.26 | 1.34 | 1.42 | 1.49 | 1.57 | 1.64 | 1.71 | 1.79 |
| 52F | 1.16 | 1.23 | 1.31 | 1.39 | 1.46 | 1.54 | 1.61 | 1.68 | 1.76 |
| 53F | 1.14 | 1.21 | 1.39 | 1.36 | 1.44 | 1.51 | 1.59 | 1.66 | 1.74 |
| 54F | 1.12 | 1.19 | 1.27 | 1.34 | 1.41 | 1.49 | 1.56 | 1.63 | 1.71 |
| 55F | 1.1 | 1.17 | 1.24 | 1.31 | 1.39 | 1.46 | 1.53 | 1.60 | 1.68 |
| 56F | 1.07 | 1.15 | 1.22 | 1.29 | 1.36 | 1.43 | 1.50 | 1.57 | 1.65 |
| 57F | 1.05 | 1.12 | 1.19 | 1.26 | 1.33 | 1.40 | 1.47 | 1.54 | 1.62 |
| 58F | 1.03 | 1.1 | 1.17 | 1.24 | 1.3 | 1.37 | 1.44 | 1.51 | 1.59 |
| 59F | 1.02 | 1.09 | 1.16 | 1.22 | 1.29 | 1.36 | 1.43 | 1.49 | 1.56 |
| 60F | 1.01 | 1.08 | 1.15 | 1.21 | 1.28 | 1.34 | 1.41 | 1.47 | 1.54 |
| 61F | 0.99 | 1.05 | 1.12 | 1.18 | 1.24 | 1.31 | 1.37 | 1.44 | 1.50 |
| 62F | 0.96 | 1.02 | 1.09 | 1.15 | 1.21 | 1.27 | 1.34 | 1.40 | 1.46 |
| 63F | 0.93 | 0.99 | 1.06 | 1.12 | 1.18 | 1.24 | 1.3 | 1.36 | 1.42 |
| 64F | 0.91 | 0.97 | 1.03 | 1.09 | 1.15 | 1.21 | 1.27 | 1.33 | 1.39 |
| 65F | 0.88 | 0.94 | 1 | 1.06 | 1.11 | 1.17 | 1.23 | 1.29 | 1.35 |

Under-Carbonated: 0-1.40   Darker Ales: 1.50-2.20   Highly Carbonated Ales: 2.60-4.00

Nitro Carbonation: 1.50-2.00   Most beers: 2.20-2.60   Over-Carbonation: 4.10+

FIG. 23A

CO2 Volume Chart

Equilibrium PSI

| 10 | 11 | 12 | 13 | 14 | 15 | 16 | 17 | 18 | 19 | 20 |
|----|----|----|----|----|----|----|----|----|----|----|
| 2.82 | 2.93 | 3.02 | 3.13 | 3.24 | 3.35 | 3.46 | 3.57 | 3.67 | 3.78 | 3.89 |
| 2.76 | 2.86 | 2.96 | 3.07 | 3.17 | 3.28 | 3.39 | 3.50 | 3.60 | 3.71 | 3.82 |
| 2.70 | 2.80 | 2.90 | 3.00 | 3.11 | 3.21 | 3.31 | 3.42 | 3.52 | 3.63 | 3.73 |
| 2.63 | 2.74 | 2.84 | 2.96 | 3.06 | 3.15 | 3.25 | 3.35 | 3.46 | 3.56 | 3.66 |
| 2.58 | 2.69 | 2.79 | 2.90 | 3.00 | 3.09 | 3.19 | 3.29 | 3.39 | 3.49 | 3.59 |
| 2.52 | 2.63 | 2.73 | 2.83 | 2.93 | 3.02 | 3.12 | 3.22 | 3.32 | 3.42 | 3.52 |
| 2.47 | 2.57 | 2.67 | 2.77 | 2.86 | 2.96 | 3.05 | 3.15 | 3.24 | 3.34 | 3.43 |
| 2.42 | 2.52 | 2.63 | 2.71 | 2.80 | 2.90 | 3.00 | 3.09 | 3.18 | 3.27 | 3.37 |
| 2.38 | 2.48 | 2.57 | 2.66 | 2.75 | 2.85 | 2.94 | 3.03 | 3.12 | 3.21 | 3.30 |
| 2.34 | 2.43 | 2.52 | 2.62 | 2.70 | 2.80 | 2.89 | 2.98 | 3.07 | 3.16 | 3.25 |
| 2.30 | 2.39 | 2.47 | 2.56 | 2.65 | 2.75 | 2.84 | 2.93 | 3.01 | 3.10 | 3.19 |
| 2.25 | 2.34 | 2.43 | 2.52 | 2.60 | 2.70 | 2.79 | 2.88 | 2.96 | 3.05 | 3.14 |
| 2.21 | 2.30 | 2.39 | 2.48 | 2.56 | 2.65 | 2.74 | 2.83 | 2.91 | 3.00 | 3.09 |
| 2.17 | 2.26 | 2.34 | 2.43 | 2.52 | 2.61 | 2.69 | 2.78 | 2.86 | 2.95 | 3.04 |
| 2.13 | 2.22 | 2.30 | 2.39 | 2.47 | 2.56 | 2.64 | 2.73 | 2.81 | 2.90 | 2.99 |
| 2.08 | 2.17 | 2.26 | 2.34 | 2.42 | 2.51 | 2.60 | 2.69 | 2.77 | 2.86 | 2.94 |
| 2.04 | 2.13 | 2.22 | 2.30 | 2.38 | 2.47 | 2.55 | 2.64 | 2.72 | 2.81 | 2.89 |
| 2.00 | 2.09 | 2.18 | 2.26 | 2.34 | 2.42 | 2.50 | 2.59 | 2.67 | 2.76 | 2.84 |
| 1.96 | 2.05 | 2.14 | 2.22 | 2.30 | 2.38 | 2.46 | 2.54 | 2.62 | 2.71 | 2.79 |
| 1.93 | 2.01 | 2.10 | 2.18 | 2.25 | 2.34 | 2.42 | 2.50 | 2.58 | 2.67 | 2.75 |
| 1.90 | 1.98 | 2.06 | 2.14 | 2.21 | 2.30 | 2.38 | 2.46 | 2.54 | 2.62 | 2.70 |
| 1.87 | 1.95 | 2.02 | 2.10 | 2.18 | 2.26 | 2.34 | 2.42 | 2.49 | 2.57 | 2.65 |
| 1.84 | 1.92 | 1.99 | 2.06 | 2.14 | 2.22 | 2.30 | 2.38 | 2.45 | 2.53 | 2.61 |
| 1.81 | 1.89 | 1.96 | 2.03 | 2.10 | 2.18 | 2.26 | 2.34 | 2.41 | 2.49 | 2.57 |
| 1.78 | 1.86 | 1.93 | 2.00 | 2.07 | 2.15 | 2.22 | 2.30 | 2.37 | 2.45 | 2.52 |
| 1.75 | 1.82 | 1.89 | 1.97 | 2.04 | 2.12 | 2.18 | 2.26 | 2.33 | 2.40 | 2.47 |
| 1.72 | 1.90 | 1.86 | 1.93 | 2.00 | 2.08 | 2.15 | 2.22 | 2.29 | 2.36 | 2.43 |
| 1.70 | 1.77 | 1.83 | 1.90 | 1.97 | 2.04 | 2.11 | 2.18 | 2.25 | 2.32 | 2.39 |
| 1.67 | 1.74 | 1.80 | 1.87 | 1.94 | 2.01 | 2.08 | 2.15 | 2.21 | 2.28 | 2.35 |
| 1.64 | 1.71 | 1.77 | 1.84 | 1.91 | 1.98 | 2.04 | 2.11 | 2.17 | 2.24 | 2.31 |
| 1.62 | 1.62 | 1.75 | 1.82 | 1.88 | 1.95 | 2.01 | 2.08 | 2.14 | 2.21 | 2.27 |
| 1.57 | 1.63 | 1.69 | 1.76 | 1.82 | 1.89 | 1.95 | 2.00 | 2.08 | 2.14 | 2.21 |
| 1.52 | 1.59 | 1.65 | 1.71 | 1.78 | 1.84 | 1.90 | 1.97 | 2.03 | 2.09 | 2.15 |
| 1.49 | 1.55 | 1.61 | 1.67 | 1.73 | 1.79 | 1.85 | 1.92 | 1.98 | 2.04 | 2.10 |
| 1.45 | 1.51 | 1.57 | 1.63 | 1.69 | 1.75 | 1.81 | 1.87 | 1.93 | 1.99 | 2.05 |
| 1.41 | 1.46 | 1.52 | 1.58 | 1.65 | 1.70 | 1.76 | 1.82 | 1.87 | 1.93 | 1.99 |

(Vertical axis label: Temperature)

Legend:
☐ Under-Carbonated: 0-1.40    ☐ Darker Ales: 1.50-2.20    ◩ Highly Carbonated Ales: 2.60-4.00
▥ Nitro Carbonation: 1.50-2.00    ▧ Most beers: 2.20-2.60    ▨ Over-Carbonation: 4.10+

FIG. 23B

CO2 Volume Chart

Equilibrium PSI

| 21 | 22 | 23 | 24 | 25 | 26 | 27 | 28 | 29 | 30 |
|----|----|----|----|----|----|----|----|----|----|
| 4.00 | 4.11 | 4.22 | 4.33 | 4.44 | 4.66 | 4.77 | 4.87 | 4.98 | 4.98 |
| 3.93 | 4.03 | 4.14 | 4.25 | 4.35 | 4.46 | 4.57 | 4.68 | 4.78 | 4.89 |
| 3.84 | 3.94 | 3.97 | 4.15 | 4.25 | 4.36 | 4.46 | 4.57 | 4.67 | 4.77 |
| 3.76 | 3.87 | 3.97 | 4.07 | 4.18 | 4.28 | 4.38 | 4.48 | 4.59 | 4.69 |
| 3.69 | 3.79 | 3.90 | 4.00 | 4.1 | 4.2 | 4.3 | 4.4 | 4.5 | 4.60 |
| 3.62 | 3.72 | 3.82 | 3.92 | 4.01 | 4.11 | 4.21 | 4.31 | 4.41 | 4.51 |
| 3.53 | 3.63 | 3.72 | 3.82 | 3.92 | 4.01 | 4.11 | 4.21 | 4.3 | 4.40 |
| 3.46 | 3.56 | 3.65 | 3.75 | 3.84 | 3.94 | 4.08 | 4.13 | 4.22 | 4.32 |
| 3.40 | 3.49 | 3.59 | 3.68 | 3.77 | 3.87 | 3.96 | 4.06 | 4.15 | 4.24 |
| 3.34 | 3.44 | 3.53 | 3.62 | 3.71 | 3.81 | 3.90 | 3.99 | 4.08 | 4.18 |
| 3.28 | 3.37 | 3.46 | 3.55 | 3.64 | 3.73 | 3.82 | 3.91 | 4.01 | 4.10 |
| 3.23 | 3.32 | 3.41 | 3.50 | 3.59 | 3.68 | 3.77 | 3.86 | 3.95 | 4.04 |
| 3.18 | 3.26 | 3.35 | 3.44 | 3.53 | 3.62 | 3.70 | 3.79 | 3.88 | 3.97 |
| 3.13 | 3.21 | 3.30 | 3.39 | 3.47 | 3.56 | 3.65 | 3.74 | 3.82 | 3.91 |
| 3.07 | 3.1 | 3.24 | 3.33 | 3.41 | 3.50 | 3.58 | 3.67 | 3.76 | 3.84 |
| 3.02 | 3.11 | 3.19 | 3.28 | 3.36 | 3.45 | 3.53 | 3.62 | 3.70 | 3.79 |
| 2.98 | 3.06 | 3.15 | 3.23 | 3.31 | 3.40 | 3.48 | 3.57 | 3.65 | 3.74 |
| 2.93 | 3.02 | 3.09 | 3.18 | 3.26 | 3.35 | 3.43 | 3.51 | 3.60 | 3.68 |
| 2.88 | 2.96 | 3.04 | 3.13 | 3.21 | 3.30 | 3.38 | 3.46 | 3.54 | 3.63 |
| 2.83 | 2.91 | 3.00 | 3.07 | 3.15 | 3.23 | 3.31 | 3.39 | 3.47 | 3.56 |
| 2.78 | 2.86 | 2.94 | 3.02 | 3.10 | 3.17 | 3.25 | 3.33 | 3.41 | 3.49 |
| 2.74 | 2.82 | 2.90 | 2.97 | 3.05 | 3.18 | 3.19 | 3.27 | 3.34 | 3.42 |
| 2.68 | 2.76 | 2.84 | 2.92 | 3.00 | 3.06 | 3.19 | 3.22 | 3.30 | 3.37 |
| 2.64 | 2.71 | 2.79 | 2.86 | 2.94 | 3.01 | 3.09 | 3.16 | 3.24 | 3.31 |
| 2.59 | 2.66 | 2.74 | 2.81 | 2.89 | 2.96 | 3.04 | 3.10 | 3.17 | 3.24 |
| 2.54 | 2.62 | 2.69 | 2.76 | 2.83 | 2.89 | 2.97 | 3.04 | 3.11 | 3.18 |
| 2.5 | 2.57 | 2.64 | 2.71 | 2.78 | 2.85 | 2.92 | 2.99 | 3.06 | 3.13 |
| 2.46 | 2.53 | 2.60 | 2.66 | 2.73 | 2.80 | 2.87 | 2.94 | 3.00 | 3.08 |
| 2.42 | 2.48 | 2.55 | 2.62 | 2.69 | 2.75 | 2.82 | 2.88 | 2.95 | 3.02 |
| 2.38 | 2.43 | 2.50 | 2.57 | 2.64 | 2.70 | 2.77 | 2.84 | 2.91 | 2.97 |
| 2.34 | 2.40 | 2.47 | 2.53 | 2.60 | 2.66 | 2.73 | 2.79 | 2.86 | 2.92 |
| 2.27 | 2.34 | 2.40 | 2.47 | 2.53 | 2.59 | 2.66 | 2.72 | 2.79 | 2.85 |
| 2.22 | 2.28 | 2.34 | 2.41 | 2.47 | 2.53 | 2.59 | 2.66 | 2.72 | 2.78 |
| 2.16 | 2.22 | 2.28 | 2.35 | 2.41 | 2.47 | 2.53 | 2.59 | 2.65 | 2.71 |
| 2.11 | 2.17 | 2.23 | 2.29 | 2.35 | 2.41 | 2.47 | 2.52 | 2.58 | 2.64 |
| 2.05 | 2.11 | 2.17 | 2.23 | 2.28 | 2.34 | 2.40 | 2.46 | 2.52 | 2.58 |

Temperature

Under-Carbonated: 0-1.40    Darker Ales: 1.50-2.20    Highly Carbonated Ales: 2.60-4.00

Nitro Carbonation: 1.50-2.00    Most beers: 2.20-2.60    Over-Carbonation: 4.10+

FIG. 23C

SYSTEMS AND TECHNIQUES FOR ENHANCING PACKAGED BEVERAGES

CROSS REFERENCE TO RELATED APPLICATION(S)

This application claims the benefit of priority of U.S. Provisional Patent Application Ser. No. 63/552,003, filed on Feb. 9, 2024, and the benefit of priority of U.S. Provisional Patent Application Ser. No. 63/650,716, filed on May 22, 2024, both of which are hereby incorporated by reference as if fully set forth herein.

TECHNICAL FIELD

Various embodiments of the present technology generally relate to improvements to packaged beverages. More specifically, embodiments of the present technology relate to systems and techniques for providing cartridges configured to release one or more remediating components into the beverage upon consumption.

BACKGROUND

Packaged beverages, such as bottled or canned carbonated drinks, are enjoyed by millions worldwide for their convenience and refreshing taste. However, despite their popularity, these beverages often degrade over time, leading to a decline in flavor quality and, consequently, negatively impacting the user's experience. One of the primary factors contributing to flavor degradation is the presence of oxygen within the beverage, which can be due to the permeability of the packaging material, which allows oxygen to slowly infiltrate the container. Oxygen exposure triggers oxidative reactions within the beverage, causing changes in flavor compounds and the breakdown of delicate aromatic molecules. Additionally, fluctuations in temperature during storage can accelerate these chemical reactions, further compromising the beverage's flavor profile. Over time, the once crisp and vibrant taste may become flat, stale, or develop off-flavors, leaving consumers disappointed with their drinking experience.

The degradation of flavor in packaged beverages, such as beer, directly impacts their shelf life, imposing constraints on how long they can maintain their desired taste and quality. Beer, for instance, is particularly sensitive to oxygen exposure and temperature fluctuations, which can rapidly alter its flavor profile. While modern packaging techniques and advancements have extended the shelf life of beers, there is still a finite window within which the beverage retains its intended characteristics. Beyond this period, the flavor degradation becomes more pronounced, leading to a noticeable decline in taste and aroma. Consequently, breweries, like other packaged beverage producers, often provide recommended consumption timelines to ensure consumers enjoy their products at their best. These timelines are often only 6-12 months to ensure optimal consumer experiences.

Accordingly, there is a need for improved systems and techniques for enhancing packaged beverages, such as by remediating flavor degradation and extending the shelf life of these products. In particular, there is a need for a cartridge that in-situ releases flavor-enhancing components into packaged beverages upon opening. As will be described in detail below, the remediating components, such as a hop additive, may be released into a packaged beverage when a consumer opens the beverage. The remediating components not only revitalize the flavor profile of the beverage, remediating any flavor degradation that may have occurred since producing and packaging of the beverage, but may also extend the shelf life of the packaged beverage.

The information provided in this section is presented as background information and serves only to assist in any understanding of the present disclosure. No determination has been made and no assertion is made as to whether any of the above might be applicable as prior art with regard to the present disclosure.

OVERVIEW

Technology is disclosed herein for systems and techniques for providing a cartridge containing remediating components to be released into a packaged beverage upon consumption. As such, the cartridge may be configured to be inserted into a packaged beverage, in some embodiments, during packaging or production of the beverage. As will be described in greater detail below, the cartridge may include a cap and a body. The body may include an inner chamber and an outer chamber formed in an annulus space between the inner chamber and an outer wall. The inner chamber may house a volume of remediating components that are released when the cartridge is activated.

The cap may include one or more pinhole orifices that allow for dissolved gas from the packaged beverage to ingress into the outer chamber. As the dissolved gas ingresses into the outer chamber, the outer chamber may equilibrate with the pressure of the packaged beverage. A seal formed between the cap and a top end of the inner chamber may prevent the dissolved gas in the outer chamber from entering the inner chamber. The cap may include various features, such as a domed structure, that causes the cartridge to orient the cap towards a bottom surface of the packaged beverage when introduced. In some embodiments, the cap may include features, such as stiffeners, that cause the cartridge to orient the pinhole orifice towards the bottom surface of the packaged beverage.

When the packaged beverage is opened, the pinhole orifice may restrict fluid flow between the outer chamber and an environment external to cartridge. In particular, the pinhole orifice may restrict the flow of the ingressed gas out of the outer chamber, thereby causing rapid volumetric expansion of the gas within the outer chamber. The volumetric expansion of the gas within the outer chamber may cause the cap of the cartridge to decouple from the body. When the cap decouples from the body, the remediating components housed within the inner chamber may release into the packaged beverage.

This Overview is provided to introduce a selection of concepts in a simplified form that are further described below in the Detailed Description. It may be understood that this Overview is not intended to identify key features or essential features of the claimed subject matter, nor is it intended to be used to limit the scope of the claimed subject matter.

BRIEF DESCRIPTION OF THE DRAWINGS

The accompanying drawings, which are incorporated into and constitute a part of this specification, illustrate one or more certain aspects and, together with the description of the example, serve to explain the principles and implementations of the certain examples.

FIGS. 22A and 22B illustrate example perspectives of a cartridge prior to and during activation within a packaged beverage, according to an embodiment herein; and FIGS. 23A-C provides a table illustrating pressures of various packaged beverages over a range of temperatures, according to an embodiment herein.

Figure 1:
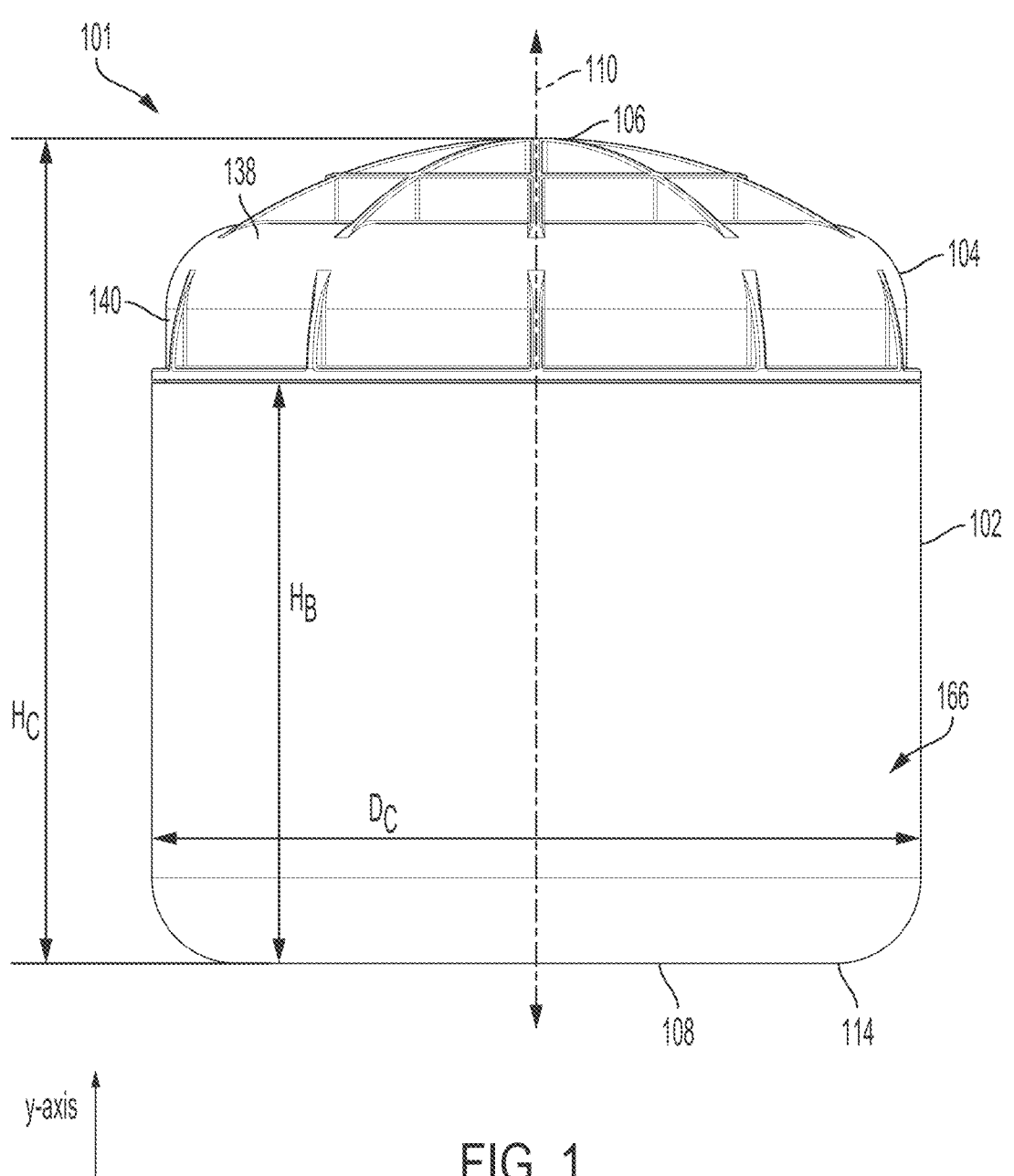
FIG. 1 illustrates an example cartridge, according to an embodiment herein.
Figure 2:
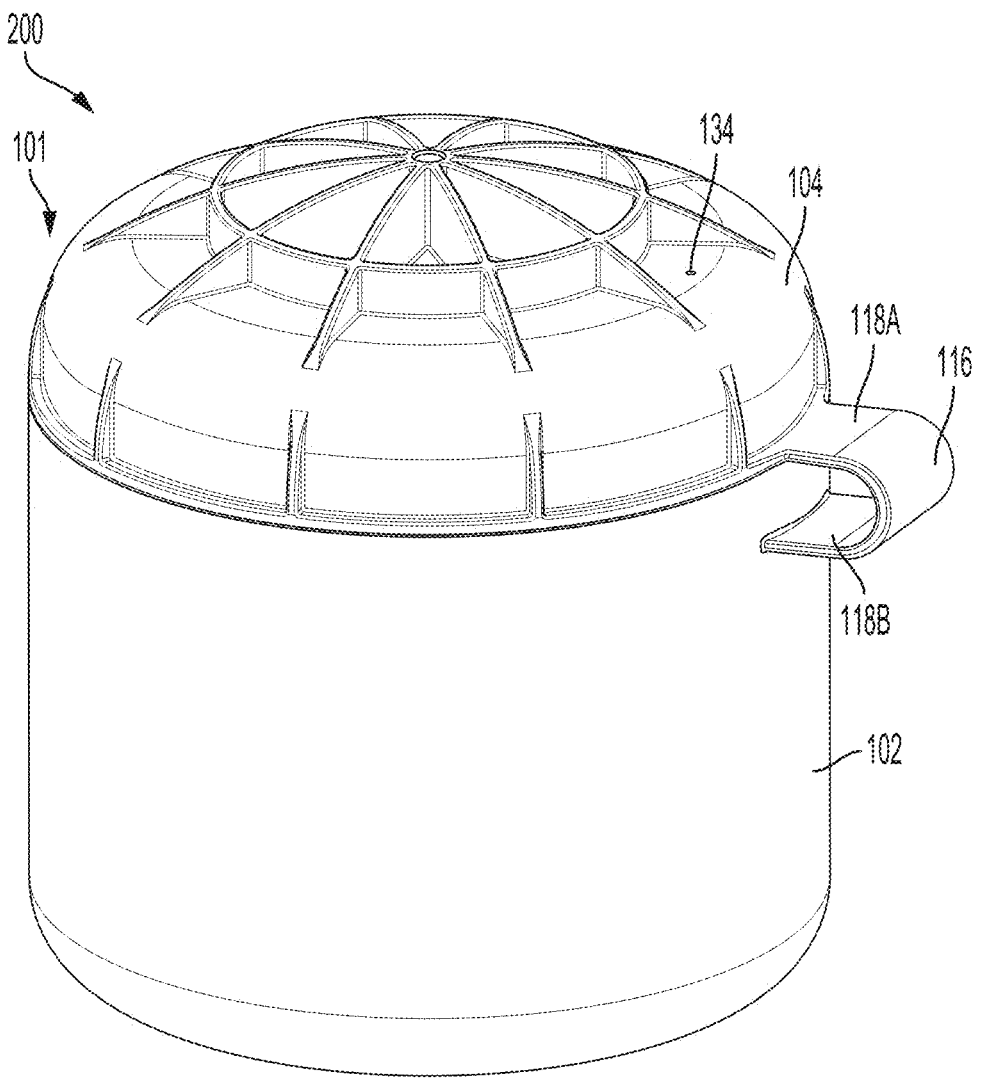
FIG. 2 illustrates a perspective of the cartridge from FIG. 1 having a hinge, according to an embodiment herein.

Some components or operations may be separated into different blocks or combined into a single block for the purposes of discussion of some of the embodiments of the present technology. Moreover, while the technology is amenable to various modifications and alternative forms, specific embodiments have been shown by way of example in the drawings and are described in detail below. The intention, however, is not to limit the technology to the particular embodiments described. On the contrary, the technology is intended to cover all modifications, equivalents, and alternatives falling within the scope of the technology as defined by the appended claims.

DETAILED DESCRIPTION

Packaged beverages, particularly carbonated drinks, have become ubiquitous in modern society, readily available in countless markets, convenience stores, vending machines, and households worldwide. These beverages, ranging from colas to beer, offer consumers a convenient and refreshing option for quenching thirst or indulging in a flavorful treat. Their popularity stems from a combination of factors, including their portability, long shelf life, and diverse flavor options, catering to a wide range of tastes and preferences.

Whether enjoyed on their own or paired with meals, packaged carbonated beverages have become ingrained in daily life, serving as go-to options for hydration, relaxation, or social gatherings. Their widespread availability and enduring appeal highlight their status as staples of modern beverage consumption.

One significant drawback of packaged beverages, including carbonated drinks, is the inevitable flavor degradation that occurs over time, influenced by various factors including oxygen exposure and temperature fluctuations. Despite meticulous efforts to maintain freshness, these beverages can undergo undesirable changes in taste and quality due to their susceptibility to external elements. Oxygen infiltration, for instance, poses a significant challenge, permeating packaging through various channels. In bottled beverages, imperfect seals between the cap and bottle can allow oxygen to slowly seep in, while canned drinks may experience ingress through micro-defects in the can's seal or minute pinholes in the aluminum. Furthermore, exposure to oxygen during the manufacturing process may initiate flavor deterioration from the start.

Additionally, temperature fluctuations during storage play a crucial role in accelerating flavor degradation. Fluctuations in temperature can cause expansion and contraction of the packaging material, leading to the ingress of external air and subsequent oxidation of the beverage. These variations can occur during transportation, storage, or even in-store display, exacerbating the degradation process. Combined with oxygen exposure, temperature fluctuations contribute to oxidative reactions within the beverage, resulting in changes such as a loss of freshness, development of off-flavors, or a decline in overall palatability over time.

The negative effects of flavor degradation extend beyond mere changes in taste, impacting both consumers and producers alike. One significant consequence is the limited shelf life of packaged beverages, which directly affects their marketability and profitability. As the flavor deteriorates, the beverage becomes less appealing to consumers, leading to decreased sales and potential waste if unsold inventory reaches its expiration date. This not only results in financial losses for producers but also contributes to environmental concerns due to increased packaging waste. Moreover, flavor degradation can tarnish a brand's reputation, eroding consumer trust and loyalty over time. Additionally, in industries like the craft beer market, where flavor nuances and freshness are highly valued, significant flavor degradation can undermine the integrity of the product and damage the reputation of the brewery. Overall, the negative effects of flavor degradation extend beyond the sensory experience, impacting the economic viability, environmental sustainability, and brand image of packaged beverage producers.

To address flavor degradation, and its negative consequences, for packaged beverages, example systems and techniques are provided herein. In particular, an example cartridge is provided herein which is configured to release one or more remediating components into a packaged beverage upon opening of the beverage by a consumer. Specifically, the cartridges provided herein include an inner chamber configured to contain one or more remediating components and an outer chamber formed in an annulus space between the inner chamber and an outer wall. The cartridge includes one or more pinhole orifices through which dissolved gases present in the packaged beverage can ingress into the outer chamber. As dissolved gases ingress into the outer chamber via the pinhole orifice(s), the outer chamber equalizes with the pressure of the packaged beverage. When the packaged beverage is opened, the ingressed gas in the outer chamber may be restricted by the pinhole orifice and undergo rapid volumetric expansion due to the pressure change. As will be described in greater detail below, the volumetric expansion of the ingressed gas may result in a cap of the cartridge decoupling from a body, thereby releasing the remediating components into the packaged beverage.

As noted, the cartridge may include one or more remediating components that are designed or selected to remediate the flavor degradation of the respective beverage. For example, if the packaged beverage is an India Pale Ale (IPA), a beer known for its hoppy profile, a cartridge may include a hop additive that, upon its release, enhances the flavor profile of the IPA. In some cases, the remediating component may return the packaged beverage to or near its original flavor profile. Following the above IPA example, the hop additive may add a fresh dose of hops to the IPA such that any degradation to the hop flavor (due to temperature fluctuation or oxygen exposure) is remediated and the IPA at the time of consumption returns to a flavor profile similar to a freshly poured draft of the IPA. Additionally, by housing the remediating components, the cartridge can prevent degradation of the remediating components by providing ultraviolet (UV) and/or light protection to the remediating components.

In other cases, the remediating component may add additional flavors to the packaged beverage, such to enhance the original flavor profile. For example, the remediating component may be a citrus concentrate (e.g., lime or orange) that may be added to the beverage to provide a twist on the original flavor profile. In still another example, the remediating component may be a solid, such as baking soda, that upon its release into the packaged beverage generates an experiential effect, such as fizzing or color changes to the beverage.

In some embodiments, in addition to remediating or enhancing the flavor profile of the packaged beverage, the remediating component may also reduce an amount of ingredients required for producing the beverage. Again, following the IPA example, by introducing the hop additive into the IPA upon opening of the can or bottle, a lower amount of hops may be required during brewing the IPA to achieve the same flavor profile upon consumption. In other words, a cartridge containing hop additive may reduce the hops required to brew the IPA by 5%, 10%, or even 15%, while maintaining the same desired flavor profile. As can be appreciated, this reduction in ingredient amounts may be the same or similar for other beverages, such as a sparkling water or seltzer in which an amount of flavoring is reduced during production but added as a remediating component via the cartridge during consumption. Not only does this reduce the cost associated with manufacturing the packaged beverages, but the cartridge may also reduce the complexity of the manufacturing process by allowing ingredients to be added at the point of consumption.

As will be described in greater detail below, the cartridge provides numerous benefits to both beverage producers and consumers. By addressing flavor deterioration, the cartridge and related techniques described below can extend the shelf life of packaged beverages, ensuring that consumers enjoy beverages at their peak freshness for longer periods. This not only enhances consumer satisfaction but also reduces product waste and associated costs, leading to improved economic sustainability. That is, the cartridges may allow producers to utilize more efficient operations and potentially lower production costs by reducing ingredient amounts and simplifying manufacturing processes. Moreover, the cartridges provided herein can also enhance product consistency and quality control, reducing the likelihood of flavor variations and ensuring a more reliable consumer experience. Overall, the cartridges and remediating components therein not only benefit producers by enhancing product quality and efficiency but also contribute to a more satisfying and sustainable consumer experience.

Turning now to the Figures, FIGS. 1-13 illustrate various views and components of an example cartridge 101, according to various embodiments herein. As shown by FIG. 1, the cartridge 101 includes a body 102 and a cap 104 and may be configured to be inserted into a packaged beverage. Packaged beverages, as used herein, are meant to encompass any beverage that is packaged in a container for convenient transportation and consumption. The containers of packaged beverages may be made from a variety of materials, including aluminum, glass, plastic, and cartons. The packaged beverages themselves may be a wide range of drinks, from water, juice, and milk to teas, coffees, and alcoholic beverages such as beer or ready-to-drink (RTD) cocktails. While the following discussion focuses on carbonated beverages, such as beer and sparkling water, it should be appreciated that the discussion is equally applicable to other types of beverages.

The cartridge 101 may have an approximately cylindrical shape defined about a central axis 110 extending along a y-axis between a first end 106 to a second end 108 of the cartridge 101. As shown, the cartridge 101 may be approximately symmetrical about the central axis 110. The cartridge 101 may have a cartridge height, $H_C$, and a cartridge diameter, $D_C$. The cartridge height, $H_C$, of the cartridge 101 may be defined parallel to the central axis 110 and the cartridge diameter, $D_C$, of the cartridge 101 may be defined orthogonal to the central axis 110. In an embodiment, the cartridge height, $H_C$, may be defined along the y-axis and the cartridge diameter, $D_C$, may be defined along the x-axis, as shown.

As can be appreciated, the size and shape of the cartridge 101 may vary depending on application, such as the packaged beverage into which the cartridge 101 is inserted into. For example, if the cartridge 101 is configured to be inserted via a mouthpiece of a bottle, such as a beer bottle, then the cartridge 101 may have larger cartridge height, $H_C$, and a smaller cartridge diameter, $D_C$, to fit through the slender mouthpiece of the bottle. In contrast, if the cartridge 101 is configured to be inserted into a can during a canning process (e.g., prior to the lid of the can being affixed), then the cartridge 101 may have a lower cartridge height, $H_C$, and a greater cartridge diameter, $D_C$. Moreover, the size and shape of the cartridge 101 may depend on an amount of remediating component being released into the packaged beverage, as will be described in greater detail below.

It should also be appreciated that while the following discussion focuses on the cartridge 101 as configured to be inserted into a personal-use sized packaged beverage (e.g., single 12-20 ounce can or bottle), the cartridge 101 may be configured for insertion into larger packaged beverages, such as a keg-style containers or larger carbonated storage containers. In such cases, while the cartridge 101 may be larger, however, the function and below description of the cartridge 101 may be equally applicable. Additionally, the dimensions of the cartridge 101 may vary depending on the application (e.g., insertion into a can vs. a glass bottle), even within personal-use sized packaged beverages.

In example embodiments, the cartridge height, $H_C$, may be in a range from 10 to 80 millimeters (mm), from 20 to 70 mm, from 30 to 60 mm, from 30 to 50 mm, and from 30 to 40 mm. Similarly, in example embodiments, the cartridge diameter, $D_C$, may be in a range from 10 to 60 mm, from 20 to 50 mm, from 20 to 40 mm, and from 20 to 30 mm. In an illustrative embodiment, the cartridge height, $H_C$, may be 29 mm while the cartridge diameter, $D_C$, may be 27 mm. In another illustrative example, such as the example cartridge 1401 described below with respect to FIGS. 14-20, the cartridge height, $H_C$, may be approximately 32 mm while the cartridge diameter, $D_C$, may be approximately 26 mm.

As shown, the body 102 may include a top end 112 and a bottom end 114. The body 102 may be cylindrical in shape having a body height, $H_B$, and a body diameter, DB. The body height, $H_B$, may be defined parallel to the central axis 110 and the body diameter, DB, may be defined orthogonal to the central axis 110. In some embodiments, the body diameter, DB, and the cartridge diameter, $D_C$, may be the same. As noted above, depending on the configuration and application of the cartridge 101, the body diameter, DB may range from 10 to 60 millimeters (mm), while the body height, $H_B$, may range from 10 to 70 mm, from 20 to 60 mm, from 20 to 50 mm, from 20 to 40 mm, and from 20 to 30 mm.

The cap 104 and the body 102 of the cartridge 101 may be monoformed, meaning they are created as a single integrated piece (e.g., unibody), typically through a molding or manufacturing process. As those skilled in the art readily appreciate, in a monoforming process, molten material is injected or molded into a single cavity mold, shaping all components simultaneously (e.g., the cap 104 and the body 102). The monoforming process ensures precise alignment and fit between the cap 104 and the body 102, resulting in a seamless and robust cartridge structure. By forming the cap 104 and the body 102 together, potential issues such as misalignment, leakage, or weak joints, often encountered in multi-piece assemblies, are minimized or eliminated. Additionally, monoforming streamlines production processes, reduces assembly time and costs, and enhances the overall reliability and performance of the cartridge 101. In some embodiments, the components of the cartridge 101 discussed below may also be formed as part of the monoforming process, meaning that the cartridge 101 is a single integrated piece. As can be appreciated, breakage concerns are significantly reduced with a single-piece construction, mitigating the risk of any detached components being inadvertently ingested by the consumer.

The cartridge 101 may be formed out of or include one or more food-grade materials, such as food-grade polymers, elastomers, aluminum, and the like. Examples of food-grade polymers may include high-density polyethlene (HDPE), low-density polyethylene (LDPE plastic), polyethylene terephthalate (PET/PETE), polypropylene (PP), polycarbonate (PC), acrylic (PMMA), polyetheretherketone (PEEL), acrylonitrile butadiene styrene (ABS), nylon (PA), and the like. Examples of food-grade elastomers may include neoprene, ethylene propylene diene monomer (EPDM), nitrile, silicon, and the like. In some embodiments, the material used to form the cartridge 101 may be selected based on the remediating component being housed by cartridge 101 to prevent absorption of the remediating component into the material (e.g., oil absorbed into PP). Additionally, manufacturing and assembly considerations may impact selection of the material to form the cartridge 101 or its components. For example, during the assembly process, the cartridge 101 or its interior components (e.g., inner chamber 124) may be subject to ultraviolet (UV) radiation. As such, a material that is food-grade but also UV stable may be selected to ensure durability and safety.

The cap 104 may be configured to releasably secure to the top end 112 of the body 102. As will be described in greater detail below, the cap 104 may be secured to the body 102 to form the cartridge 101 in a manner that allows the cap 104 to release and separate from the body 102 when the packaged beverage is opened. In some embodiments, the cap 104 and the body 102 may be separate components, however, in other embodiments, the cap 104 may be connected to the body 102 such that upon releasing, the cap 104 maintains connection with the body 102. As can be appreciated, the cap 104 and the body 102 may be securely held together using various types of connectors that ensure structural integrity and functionality. For example, as shown by perspective 200 in FIG. 2, the cartridge 101 may include a hinge 116. The hinge 116 may be attached on a first side 118A to the cap 104 and a second side 118B to the body 102. In other embodiments, instead of the hinge 116, the cartridge 101 may include a leash, such as a plastic leash, wire leash, or string that maintains connection between the cap 104 and the body 102. Another example embodiment of the hinge 116 is described in greater detail below with respect to FIGS. 14-16.

The hinge 116 may have a length, L, extending between the first side 118A and the second side 118B. The length, L, may be long enough to allow the cap 104 to release far enough apart from the body 102 as to not impede release of the remediating components housed within the body 102. In other words, the length, L, of the hinge 116 allows the cap 104 to separate far enough from the body 102 to not obstruct the release of the remediating components.

As noted above, the hinge 116 may maintain a connection between the cap 104 and the body 102. By keeping the cap 104 and the body 102 together once the cap 104 releases from the body 102, the hinge 116 may prevent the cap 104 from obstructing an opening of the packaged beverage or preventing the cap 104 from escaping the packaged beverage. As can be appreciated, the body 102 may be the larger of the two components, and by keeping the cap 104 connected to the body 102, the hinge 116 may prevent the cap 104 from negatively affecting a consumer's experience (e.g., obstructing flow of the beverage from the packaging or escaping the packaging).

Figure 3:
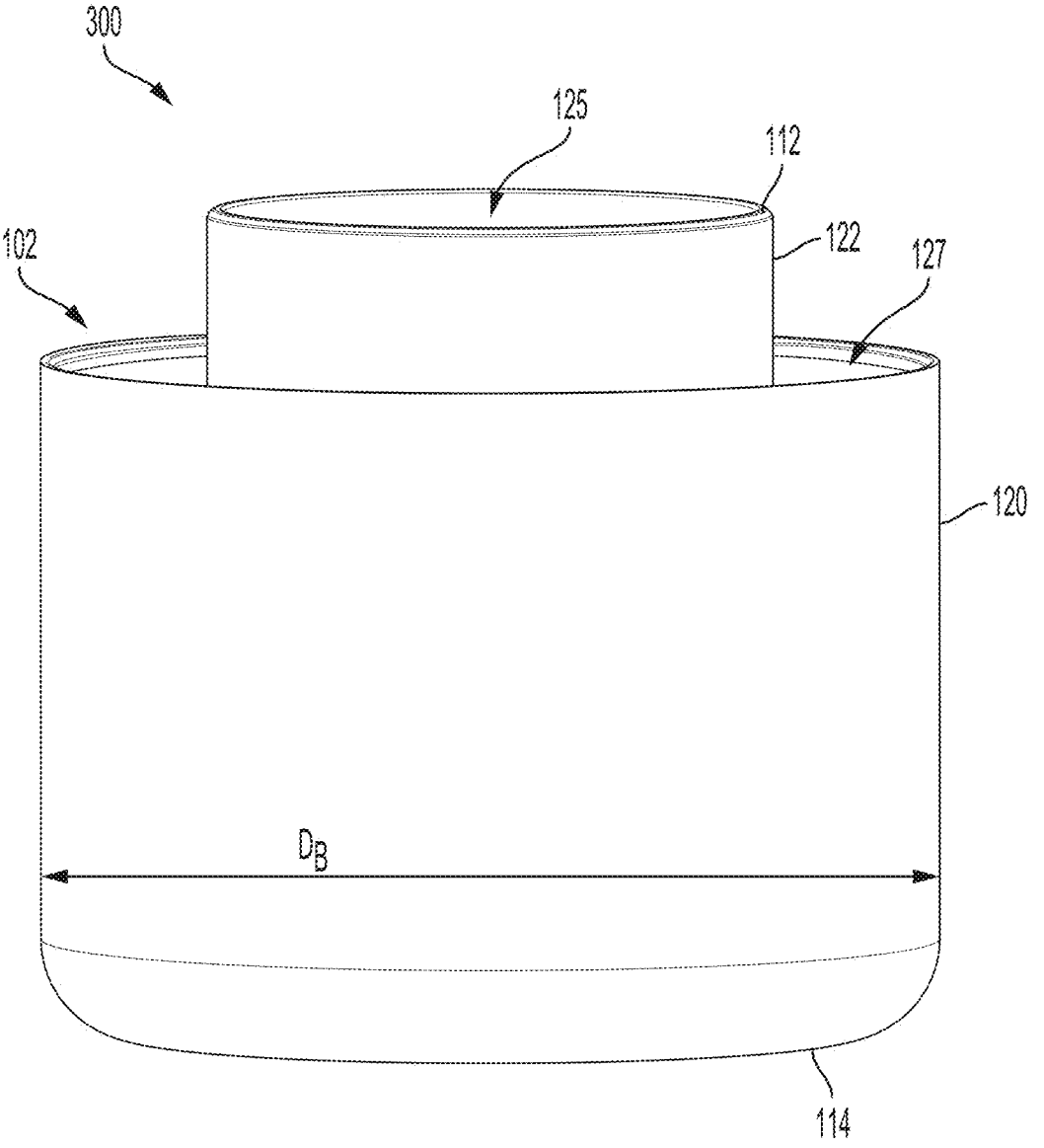
FIGS. 3-5 illustrate various perspectives of the body of the cartridge from FIG. 1, according to an embodiment herein.
Figure 4:
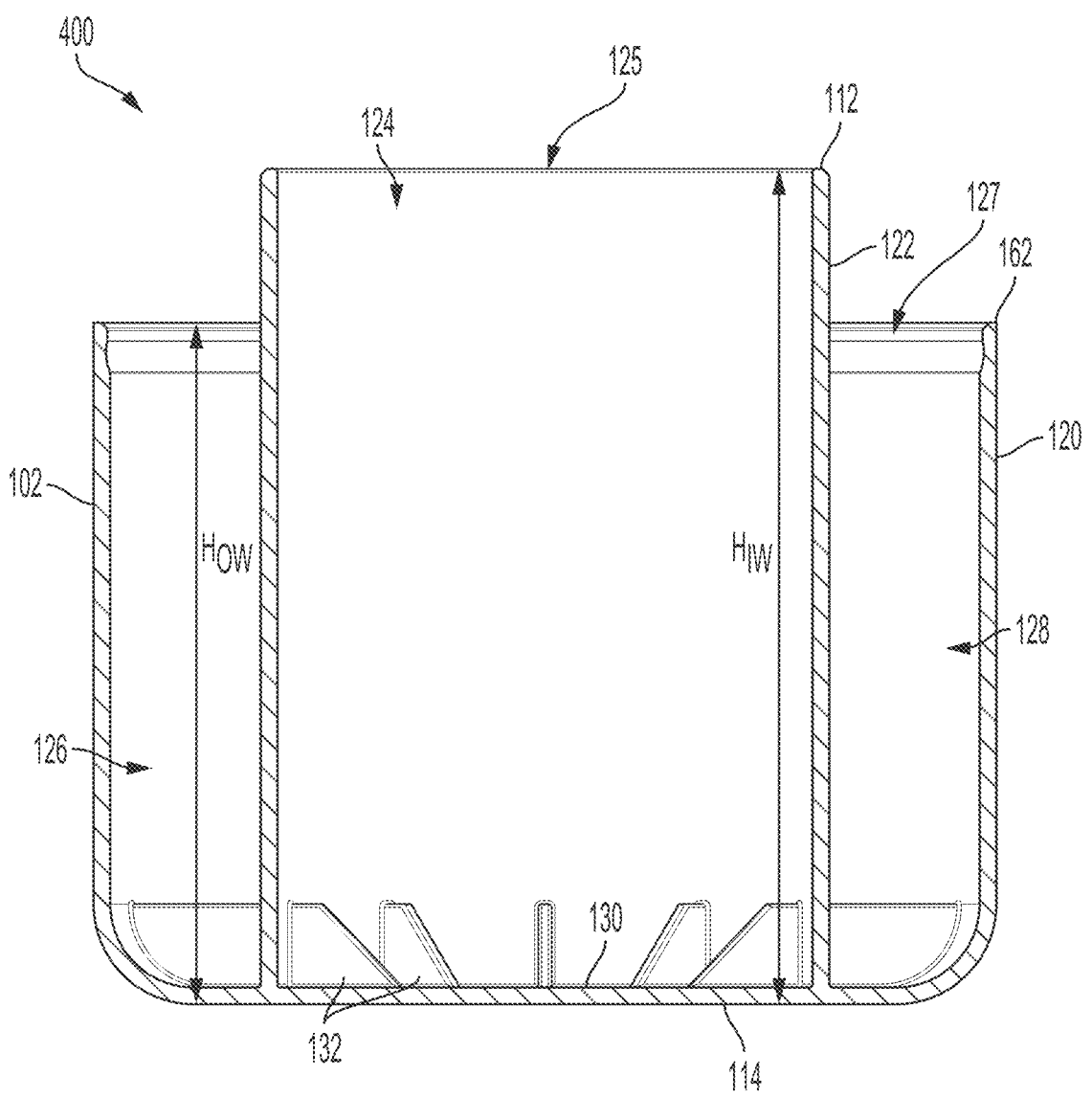
Figure 5:
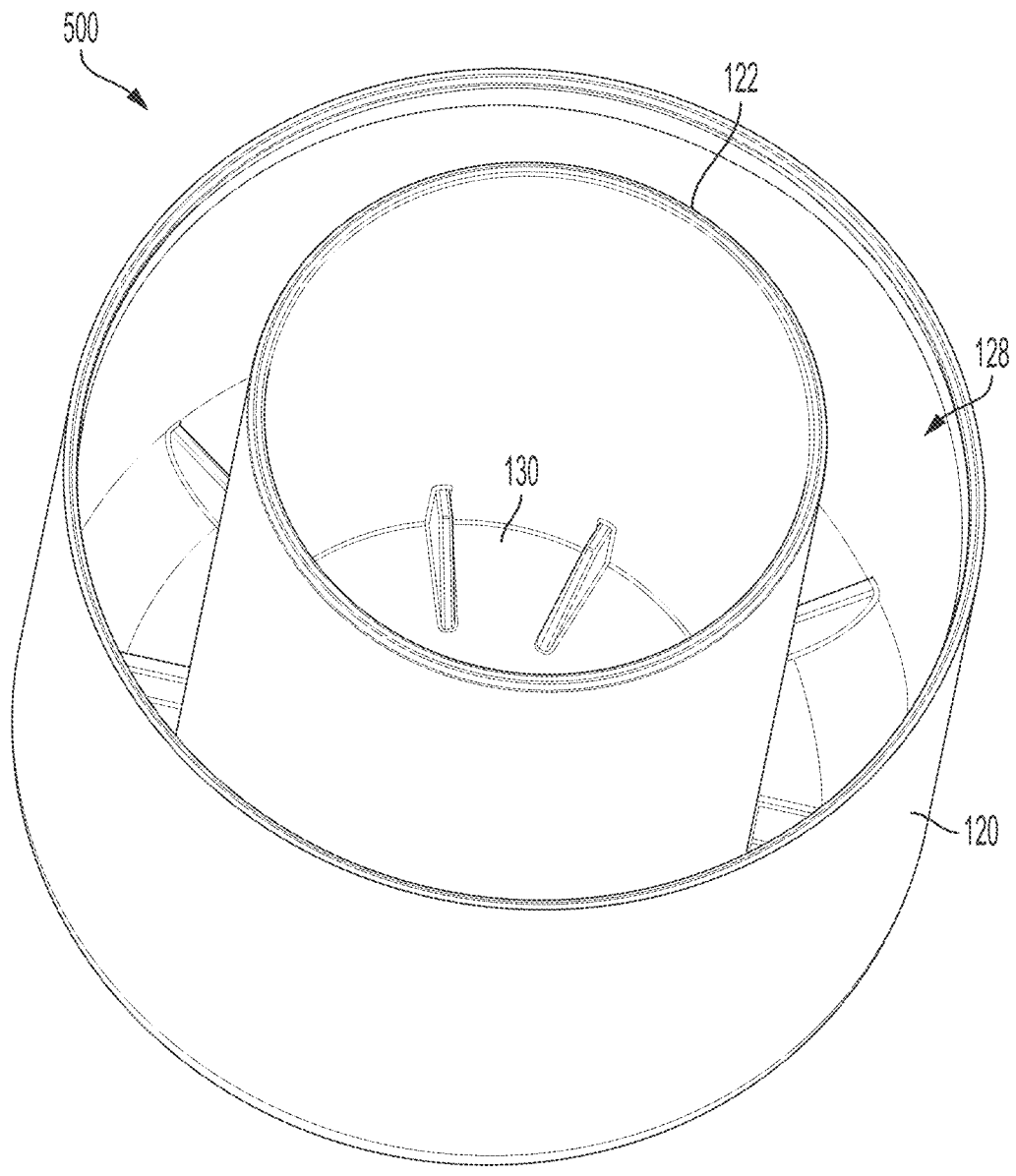

Referring now to FIGS. 3-5, perspectives 300, 400, and 500 of the body 102, respectively, are provided, according to various embodiments provided herein. As shown, the body 102 may include an outer wall 120 and an inner wall 122. The outer wall 120 may extend from the bottom end 114 towards the top end 112 parallel to the central axis 110. Similarly, the inner wall 122 may extend from the bottom end 114 towards the top end 112 parallel to the central axis 110. The inner wall 122 may form an inner chamber 124 and the outer wall 120 may form an outer chamber 126 in an annulus space 128 between the inner wall 122 and the outer wall 120.

For example, the outer wall 120 and the inner wall 122 may have a thickness equal to or less than 2 mm, equal to or less than 1.5 mm, equal to or less than 1 mm, or equal to or less than 0.5 mm. In an example embodiment, the outer wall 120 and the inner wall 122 may have a nominal thickness of approximately 0.62 mm. In some embodiments, the outer wall 120 and the inner wall 122 may have the same thickness, while in other embodiments the outer wall 120 and the inner wall 122 may have different thicknesses.

As shown, the inner wall 122 may have a height, $H_{IW}$, that is greater than the height, $H_{OW}$, of the outer wall 120. For example, the height, $H_{IW}$, of the inner wall 122 may be in a range from 10 mm to 40 mm, from 15 mm to 35 mm, from 20 mm to 30 mm, or 25 mm to 30 mm, while the height, $H_{OW}$, of the outer wall 120, may be in the range from 5 mm to 35 mm, from 10 mm to 30 mm, from 15 mm to 25 mm, or from 18 mm to 22 mm. In some embodiments, the height, $H_{OW}$, of the outer wall 120 may be the same or similar to the body height, $H_B$. In other embodiments the height, $H_{IW}$, of the inner wall 122 may be greater than the height, $H_{OW}$, of the outer wall 120 to form a seal with an interior surface 172 of the cap 104, while the outer wall 120 seals with a side wall of the cap 104. In an example embodiment, the height, $H_{IW}$, of the inner wall 122 may be between 2 mm to 3 mm higher than the height, $H_{OW}$, of the outer wall 120. For example, the height, $H_{OW}$, of the outer wall 120 may be 24 mm while the height, $H_{IW}$, of the inner wall 122 may be 26.6 mm. As will be described in greater detail below with respect to FIGS. 19-20, in some embodiments, the inner wall 122 may have an inclined height, $H_{IW}$, to aid in release of the cap 104.

Figure 6:
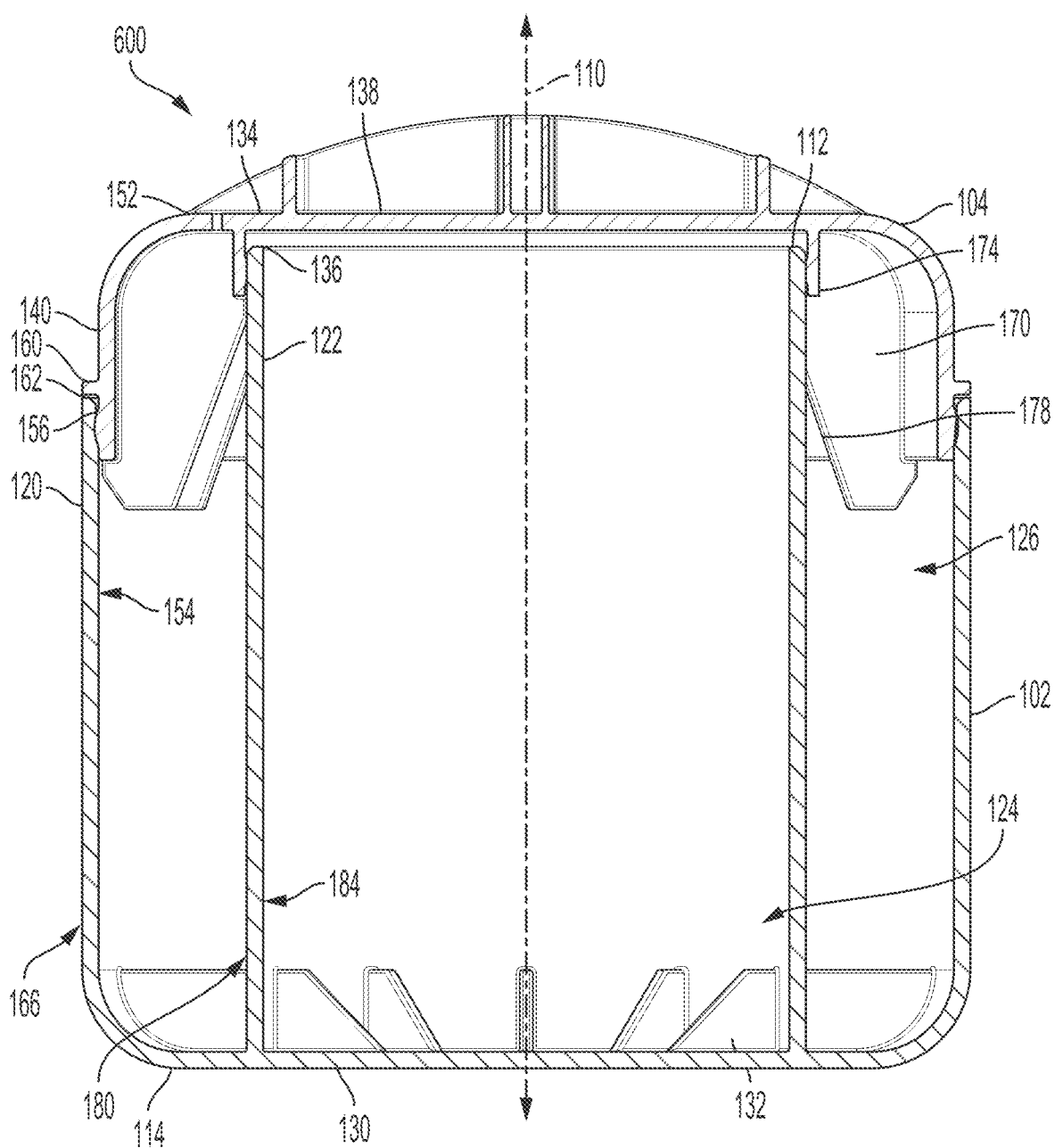
FIG. 6 illustrates a cross-sectional perspective of the cartridge from FIG. 1, according to an embodiment herein.
Figure 7:
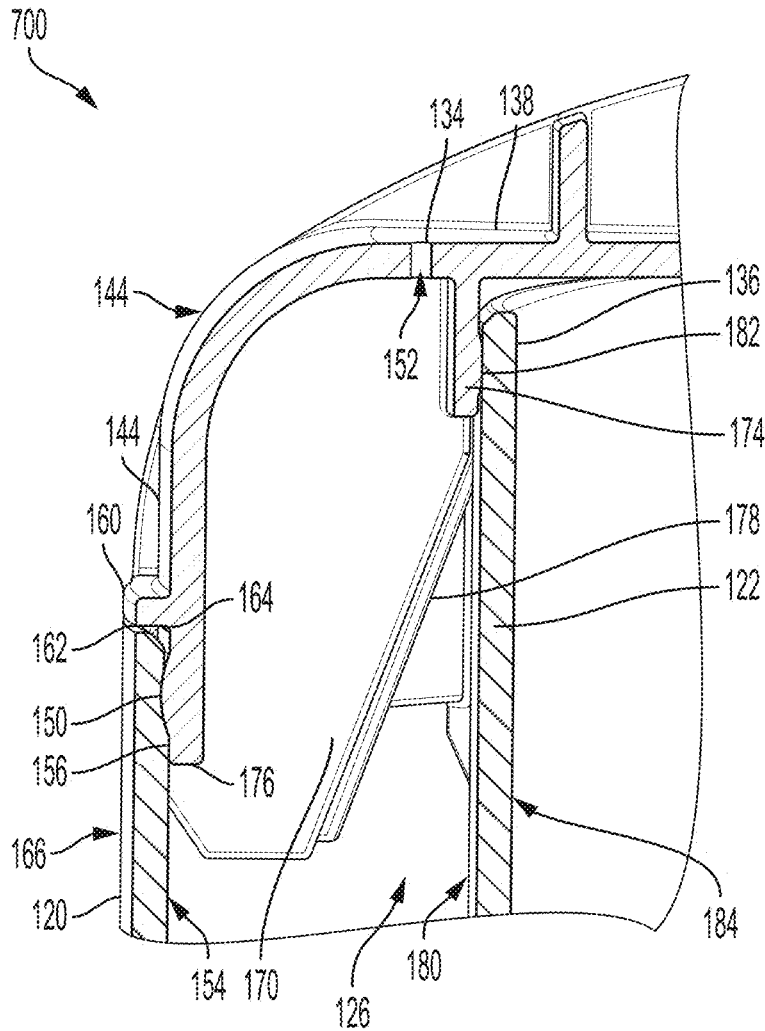
FIG. 7 illustrates a close-up cross-sectional perspective of seals formed between the cap and body in the cartridge from FIGS. 1, according to an embodiment herein.

As shown by perspectives 600 and 700 of FIGS. 6-7, an end 136 of the inner wall 122 positioned towards the top end 112 of the body 102 along the central axis 110 may form a seal with the cap 104. In particular, the end 136 of the inner wall 122 may form an interference seal with the cap 104. The fitting of the cap 104 to the body 102, in particular the seals formed by this fitting are described in greater detail below. It should be appreciated that while the illustrated example depicts the interference seal as a radial seal, in other embodiments the interference seal may be an axial or face seal. In other words, in some embodiments, the cap 104 may form a radial seal or lip seal with the body 102, while in other embodiments, the cap 104 may form an axial or face seal with the body 102.

Figure 13:
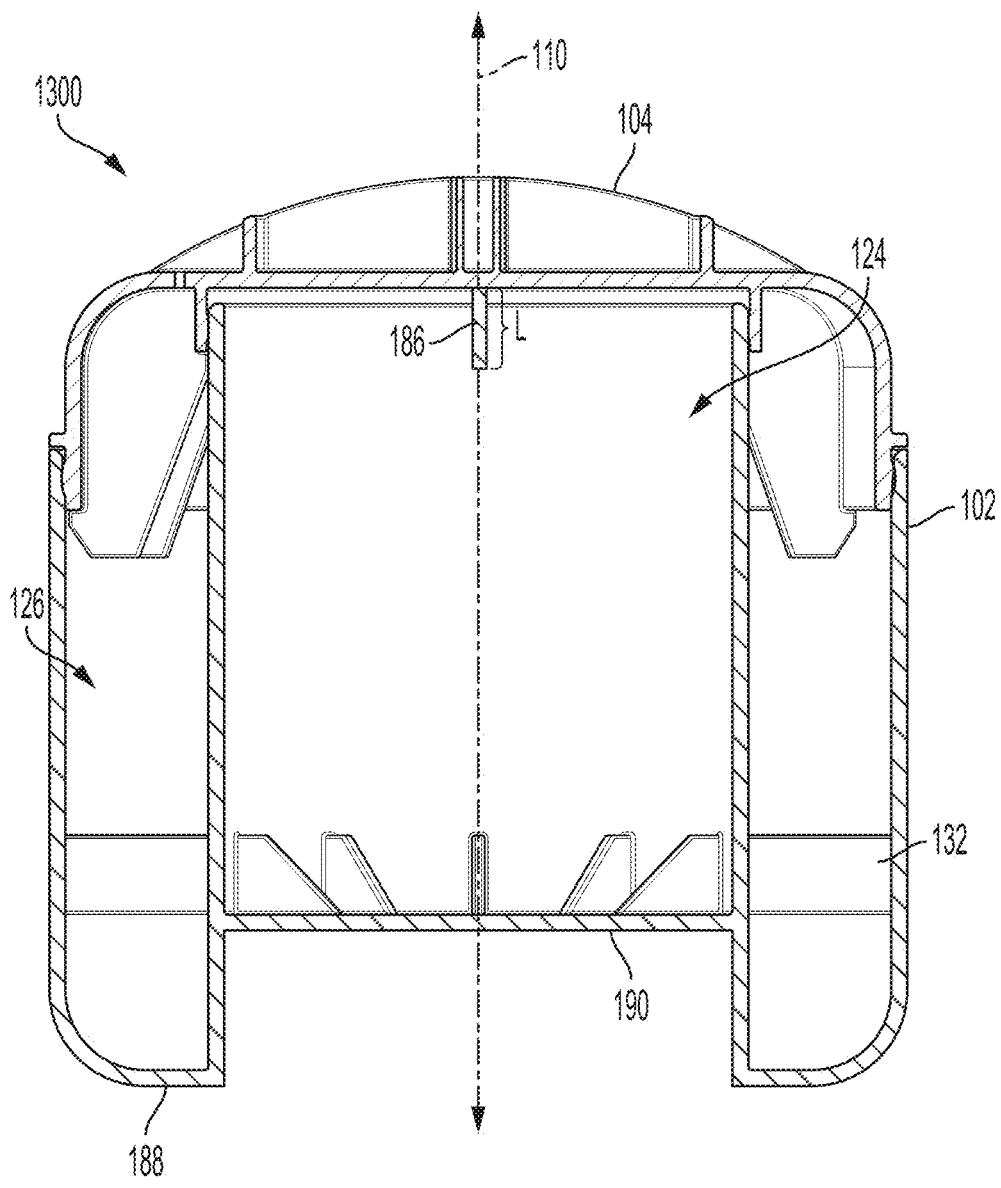
FIG. 13 illustrates a perspective of the cartridge of FIG. 1 including a stillwand, according to an embodiment herein.
Figure 14:
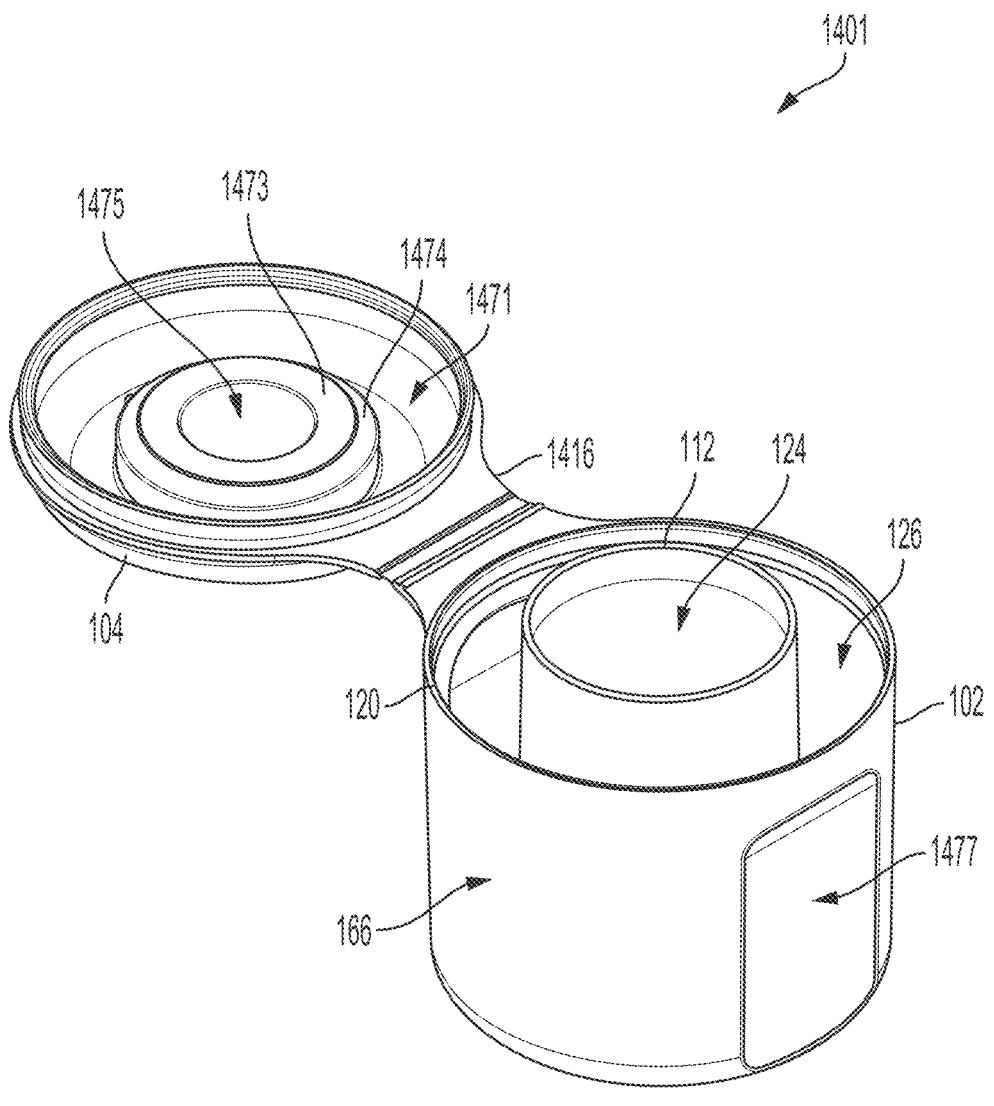
FIG. 14 illustrates another example cartridge, according to an embodiment herein.

The inner chamber 124 of the body 102 may be configured to be filled with one or more remediating components. In particular, the inner chamber 124 may include an opening 125 at a top end 112 into which the remediating components may be introduced into the inner chamber 124. As such, the inner chamber 124 may have a volume based on an amount of remediating components to be released into the packaged beverage. In other words, the inner chamber 124 may have a volume based on a volume of remediating components desired to be released into the packaged beverage. In various embodiments, the volume of the inner chamber 124 may be in a range from 1 milliliters (mL) to 10 mL, from 1 mL to 8 mL, from 1.5 mL to 6 mL, from 2 mL to 5 mL, from 2.5 mL to 4.5 mL, or from 3 mL to 4 mL, depending on the remediating component and desired amount of remediating component being released into the packaged beverage. As will be described in greater detail below, it may be desirable that the remediating component completely fill or close to completely fill the inner chamber 124 as to avoid any gaseous components in the inner chamber 124. To achieve this, the remediating component may be diluted to fill the volume of the inner chamber 124 or the volume of the inner chamber 124 may be modified based on the amount of remediating component, such as illustrated in FIG. 13.

The remediating components provided herein may be non-gaseous components that are released by the cartridge 101 upon opening of the packaged beverage. The type of remediating component may vary depending on the packaged beverage (e.g., sparkling water vs. beer) and an intended result of the remediating component (e.g., enhancing a flavor profile vs. enhancing user experience). Remediating components, as provided herein, may be any non-gaseous component that may be added to a beverage to enhance the consumer experience, shelf life of the packaged beverage, or reduce manufacturing costs of the beverage. Following the above IPA example, the remediating component may be a hop additive (e.g., hop flavoring additive), hop concentrate or a hop oil that is added to the IPA upon consumption to return the IPA close to an original, as-brewed flavor profile. The hop additive may also allow for the IPA to be brewed with less hops, thereby reducing the overall manufacturing costs of the IPA. Additionally, since the hop additive returns the IPA to an original flavor profile, introduction of the hop additive at consumption of the IPA may extend the shelf life of the IPA.

In some embodiments, the remediating component may be a flavor concentrate or flavor oil, such as lime concentrate, mint oil, or mango juice that is released into a packaged beverage. For example, if the packaged beverage is a mint tea or a RTD mojito, the remediating component may be a mint oil or concentrate. Since the flavor of herbs, such as mint, may degrade over time, releasing and mixing the mint oil/concentrate into the beverage at time of consumption, which is assumed to be at or close to opening of the packaged beverage, the flavor profile of the beverage is enhanced, the shelf life of the beverage extended, and in some cases, the manufacturing costs reduced as less mint may be required during production to achieve the same flavor profile at consumption.

In some cases, instead of a liquid, such as an oil or concentrate, the remediating component may be a solid. For example, the remediating component may be baking soda that upon release into the beverage at consumption causes fizzing in the beverage, thereby enhancing the consumer experience. In another example, a solid-phase remediating component may be salt or another type of spice that is added upon conception to enhance the consumer experience and enhance the flavor profile of the beverage. In some embodiments, more than one remediating component may be added, such as a lime concentrate and mint oil into a RTD mojito.

Depending on the type and quantity of remediating components being introduced, the volume and configuration of the inner chamber 124 may be modified. As described above, depending on the volume or amount of remediating component to be released, the volume of the inner chamber 124 may be modified to reduce headspace. In other embodiments, there may be more than one inner chamber 124. For example, if two or more remediating components are to be released, and it is desirable to not pre-mix the remediating components prior to release, the inner chamber 124 may be modified to include two or more chambers to keep the remediating components separate. Following the above RTD mojito example where the remediating components include lime concentrate and mint oil, it may be desirable to keep the lime concentrate and mint oil separate until release. As such, the cartridge 101 may include two inner chambers 124: one for the mint oil and one for the lime concentrate. It should be appreciated that there may be any number of inner chambers 124, depending on the quantity of remediating component types being released. For example, there may be two inner chambers 124, three inner chambers 124, four inner chambers 124, or five inner chambers 124.

In some embodiments, the inner wall 122 of the inner chamber 124 may be coated or lined with a food-grade material to facilitate the release of the remediating component. Certain remediating components, such as mint oil or hop oil, have high viscosity, which can cause them to adhere to the inner wall 122 after the cap 104 is released. This adherence reduces the amount of remediating component that enters the packaged beverage, potentially diminishing its effectiveness. To compensate, additional remediating component could be added to the inner chamber 124, but this increases production costs and may require a larger cartridge 101. A larger cartridge could, in turn, reduce the total beverage volume within the packaging, potentially affecting regulatory compliance. To mitigate these issues, the inner wall 122 may be coated with a food-grade, nonstick material such as polytetrafluoroethylene (PTFE), silicone-based coatings, or food-safe lacquer. These coatings help ensure that the remediating component fully disperses into the beverage, improving efficacy without the need for increased volume or cost.

Additionally, the shape of the inner chamber 124 may be modified to aid in filling the cartridge 101. As described in greater detail below with respect to FIGS. 15 and 19-20, The bottom wall 130 of the inner chamber 124 may be curved or rounded to minimize splash back of the remediating component during filling and/or to facilitate its release. For example, eliminating corners or 90-degree angles by rounding the bottom wall 130 can prevent surface tension from forming between the inner wall 122 and the bottom wall 130, which might otherwise hinder the release of the remediating component trapped in these areas. Additionally, if the remediating component has low viscosity, a rounded bottom wall 130 can help reduce splash back that would typically occur with a flat-bottomed design.

Although the remaining discussion focuses on hop additive as the remediating component, it should be appreciated that the discussion is equally applicable to any other remediating component. For example, the remediating components as provided herein may include one or more of a hop additive, herb concentrate, additive, or oil (e.g., mint, basil, rosemary, lavender, lemongrass), citrus concentrate, additive, or oil (e.g., lemon, lime, orange, grapefruit), salt, baking soda, rock candy (e.g., Pop-Rocks™), and the like.

The outer chamber 126 may be configured to fill with dissolved gas from the packaged beverage such to reach an equilibrium with the packaged beverage. As shown by FIGS. 3-5, the outer chamber 126 may include an annulus opening 127 extending about the inner wall 122. When the cap 104 is fitted to the body 102, the annulus opening 127 may be sealed from the external environment by the cap 104. As such, as shown by perspective 600 in FIG. 6, the cap 104 may include a pinhole orifice 134 through which dissolved gas from the packaged beverage ingresses into the outer chamber 126 to equalize the outer chamber 126 with the pressure of the packaged beverage. As is appreciated, packaged beverages, such as canned beer or sparkling water, commonly contain dissolved gases, such as carbon dioxide. During the packaging process, the beverage is sealed into the container under pressure, allowing gasses to dissolve into the liquid. This process alters the pressure of the gases within the packaged beverage. When the cartridge 101 is inserted into the packaged beverage, the cartridge 101 is at atmospheric pressure and as such, the dissolved gas within the beverage may ingress into the outer chamber 126. As the dissolved gas from the beverage ingresses into the outer chamber 126 from the beverage, the outer chamber 126 may equilibrize with the pressure of the packaged beverage. In other words, once the dissolved gas ingresses into the outer chamber 126, the outer chamber 126 may have a pressure that is approximately equal to the pressure of the packaged beverage.

The volume of the outer chamber 126 may depend, in part, on the pressure of the packaged beverage. For example, the volume of the outer chamber 126 may be proportional to an amount of energy required to release the cap 104 from the cylindrical body 102. As will be described in greater detail below, to release the cap 104 from the body 102, the dissolved gas within the outer chamber 126 may undergo rapid volumetric expansion when the packaged beverage is opened. Because the dissolved gas in the outer chamber 126 is at equilibrium with the packaged beverage before opening, the dissolved gas in the outer chamber 126 may be at the same pressure as the packaged beverage before opening. When the packaged beverage is opened, the pressure of the packaged beverage adjusts to atmospheric pressure. Since the dissolved gas in the outer chamber 126 is restricted by the pinhole orifice 134, it is unable to adjust to atmospheric pressure and as such undergoes rapid volumetric expansion in the outer chamber 126. The greater the pressure difference between the dissolved gas trapped in the outer chamber 126 and atmospheric pressure, the greater the volumetric expansion of the trapped gas. As such, when the pressure of the packaged beverage is higher, the volume of the outer chamber 126 may be less than when the pressure of the packaged beverage is lower. Because a lower pressure results in a lower pressure differential between the trapped gas in the outer chamber 126 and atmospheric pressure, a larger volume of trapped gas may be required to release the cap 104 from the body 102.

As is illustrated by Table 2300 in FIGS. 23A-C, the pressure of the packaged beverage may depend on the type of beverage and the temperature. As such, the volume of the outer chamber 126 may vary depending on the type of beverage and temperature. In various embodiments, the volume of the outer chamber 126 may be in a range from 2 mL to 10 mL, from 3 mL to 9 mL, from 4 mL to 8 mL, from 4 mL to 7 mL, or from 5 mL to 6 mL. In an example embodiment, the volume of the outer chamber 126 may be approximately 7.1 mL.

Returning now to FIG. 6, the bottom end 114 of the body 102 may include a bottom wall 130. In some embodiments, the bottom wall 130 may form the bottom surface of both the inner chamber 124 and the outer chamber 126. As shown, the bottom wall 130 of the body 102 may include one or more bottom stiffeners 132. The bottom stiffeners 132 may extend along the central axis 110 towards the top end 112 of the body 102. The bottom stiffeners 132 may provide structural rigidity to the body 102. As noted above, the outer chamber 126 may equalize with the pressure of the packaged beverage as the dissolved gas ingresses into the outer chamber 126. The remediating components within the inner chamber 124, however, may not equalize to the pressure of the packaged beverage. That is, not only are the remediating components in a different phase state (e.g., liquid or solid) than the ingressed gas in the outer chamber 126, but the inner chamber 124 is sealed off from the outer chamber 126, meaning that the inner chamber 124 maintains the pressure at which it was filled and/or sealed (e.g., atmospheric pressure). As such, the inner chamber 124 and the outer chamber 126 may be at different pressures. As those skilled in the art readily appreciate, this may result in various forces being exerted on the inner wall 122. As such, the bottom stiffeners 132 may provide structural support to the inner wall 122, thereby mitigating the effects of the unequal pressures between the two chambers.

In an embodiment, the bottom stiffeners 132 may extend from the outer wall 120, through the inner wall 122, and into the inner chamber 124. In some embodiments, the bottom stiffeners 132 may converge at a central point within the inner chamber 124, while in other embodiments, such as the illustrated embodiment, the bottom stiffeners 132 may not converge and instead remain distinct from one another. In some embodiments, the bottom stiffeners 132 may be equally spaced in a circumferential manner about the bottom wall 130.

The cap 104 may also include a variety of stiffeners or supporting elements to provide rigidity to the cartridge 101. With reference to FIGS. 9-12B, various perspectives 900 to 1200B, respectively, of the cap 104 are provided, according to various embodiments provided herein. As shown, the cap 104 may include a first side 138 and a second side 140. The first side 138 may be facing or directed towards the first end 106 of the cartridge 101, while the second side 140 may be approximately orthogonal to the first side 138. In some embodiments, the second side 140 may be perpendicular to the first side 138 such that the second side 140 is approximately parallel to the central axis 110 of the cartridge 101. As can be appreciated, the orientation of the first side 138 and the second side 140 to each other may vary depending on the overall configuration of the cartridge 101.

As noted above, the cap 104 may include one or more structures or components that provide support and rigidity to the cap 104 and/or the cartridge 101. For example, the cap 104 may include one or more stiffeners, ribs, braces, girders, plates, and the like. It should be appreciated that while the following discussion is with respect to stiffeners, other supporting components may be used. This is equally applicable with respect to the body 102 and the body stiffeners 132 described above.

As shown, the first side 138 of the cap 104 may include top stiffeners 142. The top stiffeners 142 may extend away from an exterior surface 144 of the cap 104 parallel to the central axis 110. As illustrated, the top stiffeners 142 may be positioned circumferentially about the exterior surface 144 to provide uniform support about the exterior surface 144 of the cap 104. In some embodiments, the top stiffeners 142 may form a domed structure 146. The domed structure 146 incorporated into the cap 104 may provide both support and rigidity by distributing applied forces evenly across the exterior surface 144 of the cap 104, thereby minimizing stress concentrations. As such, the domed structure 146 enhances the cap's 104 ability to withstand external loads and impacts, ensuring structural integrity and longevity of the cartridge 101.

In addition to providing support and rigidity to the cap 104, the domed structure 146 may have a mass such that when the cartridge 101 is introduced into the packaged beverage, the domed structure 146 causes the cartridge 101 to orient downwards towards a bottom of the packaged beverage. That is, the domed structure 146 adds weight to the first end 106 of the cartridge 101 such to cause the cartridge 101 to orient the first end 106 towards the bottom of the packaged beverage when the cartridge 101 is introduced into the packaged beverage. This is described in greater detail with respect to FIGS. 22A and 22B.

The domed structure 146 may include a domed surface 148. As shown, the domed surface 148 slopes away from the exterior surface 144 of the first side 138 along the central axis 110 and converges at an apex 150 of the domed structure 146. The apex 150 may be the point at which the cartridge height, $H_C$, is at a maximum.

In addition to providing additional mass to the first end 106 of the cartridge 101, the domed structure 146 may also aid in achieving equilibrium of the cartridge 101 with the packaged beverage. As shown, the cap 104 includes the pinhole orifice 134. The pinhole orifice 134 may form a channel between an environment external to the cartridge 101 and the outer chamber 126. As noted above, to achieve equilibrium between the outer chamber 126 and the pressure of the packaged beverage, dissolved gas may ingress into the cartridge 101, in particular into the outer chamber 126, via the pinhole orifice 134. The domed surface 148 may prevent the pinhole orifice 134 from being obstructed by a surface of the packaged beverage. Obstruction of the pinhole orifice 134 may prevent the cartridge 101 from reaching equilibrium with the packaged beverage, thereby resulting in the cap 104 being unable to detach from the body 102 and release the remediating components housed therein.

As shown the pinhole orifice 134 may be positioned between two of the top stiffeners 142 of the domed structure 146. As noted above, when the cartridge 101 is introduced into the packaged beverage, the weight or mass of the domed structure 146 may cause the cartridge 101 to orient the cap 104 towards the bottom of the packaged beverage. As such, portions of the cap 104 may contact the bottom surface of the packaged beverage. By positioning the pinhole orifice 134 between the two top stiffeners 142, the domed surface 148 prevents the pinhole orifice 134 from being obstructed by the surface of the packaged beverage. The domed surface 148 may contact the surface of the packaged beverage instead and allow dissolved gas to freely ingress into the outer chamber 126 via the pinhole orifice 134.

In some embodiments, the cap 104 may have more than one pinhole orifice 134. For example, the cap 104 may have two or more, three or more, or four or more pinhole orifices 134. In some embodiments, as the number of pinhole orifices 134 increases, the smaller the diameter of the pinhole orifices 134 may be. In other words, the pinhole orifice(s) 134 may have a total orifice surface area through which dissolved gas can ingress into the outer chamber 126. As such, if there is a single pinhole orifice 134, then the single pinhole orifice 134 may have a larger orifice surface area. In contrast, if there are two pinhole orifices 134, then the orifice surface area of the two pinhole orifices 134 may half that of a single pinhole orifice 134 as to achieve the same orifice surface area. As can be appreciated, by maintaining an orifice surface area regardless of the number of pinhole orifices 134, an amount of backpressure generated in the outer chamber 126 upon consumption of the beverage can be maintained. In example embodiments, the orifice surface area may be in a range from 0.1 to 0.5 mm, from 0.2 to 0.4 mm, or from 0.3 to 0.4 mm. In some embodiments, the pinhole orifice 134 may include a gas permeable membrane such as a PTFE membrane.

In some embodiments, the outer chamber 126 may be configured to house the remediating components and the inner chamber 124 may be configured to house ingressed gas. In such cases, the pinhole orifice 134 may provide the channel 152 between the inner chamber 124 and the external environment. In other words, in some embodiments, cartridge 101 may be configured such that dissolved gas from the packaged beverage ingresses into the inner chamber 124 while the outer chamber 126 houses the remediating components.

As can be appreciated, the more pinhole orifices 134 present in the cap 104, the faster the cartridge 101 may equalize with the pressure of the packaged beverage. In some embodiments, the cartridge 101 may equalize with the pressure of the packaged beverage within 30 seconds, within 20 seconds, within 10 seconds, or within 5 seconds or less. Once the cartridge 101 is equalized with the pressure of the packaged beverage, the cartridge 101 may be primed for activation and release of the remediating components into the beverage, which may occur when the packaged beverage is opened.

As noted above, the cartridge 101 may be configured to release the remediating components that are housed in the inner chamber 124 upon opening of the packaged beverage. When the packaged beverage is opened, the pressure of the packaged beverage may undergo rapid decompression. That is, opening the packaged beverage may change (e.g., reduce) the pressure of the packaged beverage to pressure of the external environment, most likely atmospheric pressure. This change in pressure may cause the ingressed gas in the outer chamber 126 to undergo rapid volumetric expansion. The pinhole orifice 134, however, may restrict the flow of the ingressed gas out of the outer chamber 126. As such, the volumetric expansion of the ingressed gas may cause the cap 104 to decouple from the top end 112 of the body 102. The decoupling of the cap 104 from the body 102 is discussed in greater detail below.

As shown by FIG. 7, the pinhole orifice 134 may include a channel 152 between the outer chamber 126 and an environment external to the cartridge 101. That is, the channel 152 may be formed through the cap 104. In the illustrated example, the channel 152 of the pinhole orifice 134 is formed through the first side 138 of the cap 104, however, it should be appreciated that in some embodiments the pinhole orifice 134 may be formed in the second side 140 of the cartridge 101. In some embodiments, the channel 152 may be cylindrical in shape, thereby having a consistent diameter through its length. A consistent diameter throughout the length of the channel 152 may allow for simple manufacturing or construction of the pinhole orifice 134.

Figure 8:
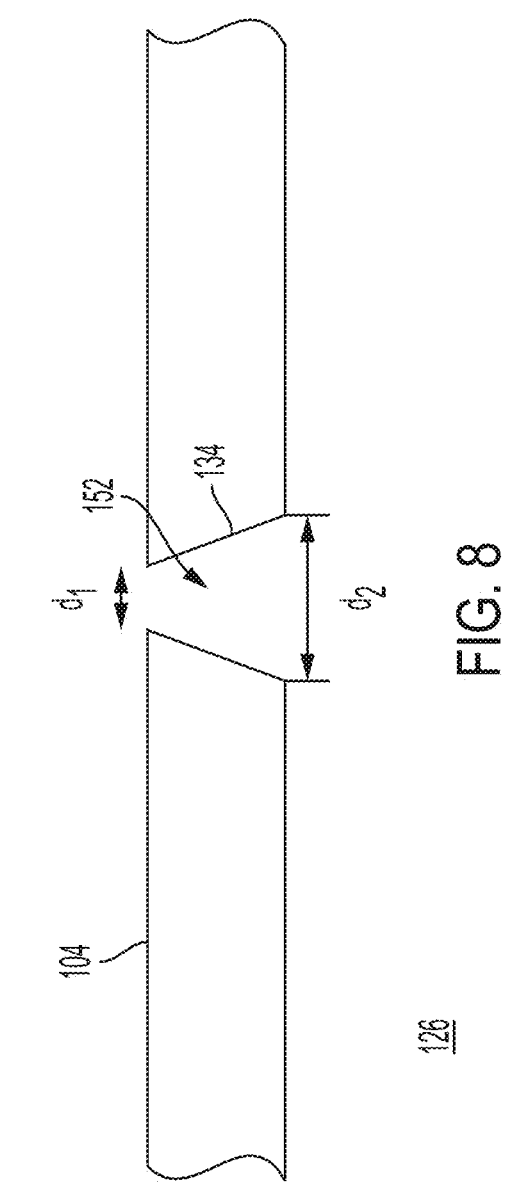
FIG. 8 illustrates the pinhole orifice having a conical shaped channel, according to an embodiment herein.

As shown in FIG. 8, in other embodiments, the channel 152 may have a conical shape such that one side of the channel 152 has a first diameter, $d_1$, while the second side of the channel 152 has a second diameter, $d_2$. For example, the first diameter, $d_1$, may be oriented towards the external environment while the second diameter, $d_2$, is oriented towards the outer chamber 126. The first diameter, $d_1$, may be smaller than the second diameter, $d_2$, with the channel 152 tapering between the second diameter, $d_2$, and the first diameter, $d_1$. By tapering from a larger second diameter, $d_2$, exposed to the outer chamber 126 to the smaller first diameter, $d_1$, exposed to the external environment, the channel 152 may support backpressure buildup in the outer chamber 126, thereby aiding in release of the cap 104 upon opening of the packaged beverage.

In contrast, in some embodiments, instead of the first diameter, $d_1$, being smaller than the second diameter, $d_2$, the first diameter, $d_1$, may be larger than the second diameter, $d_2$. As such, the channel 152 may taper from the external environment to the outer chamber 126. Tapering the channel 152 in this manner may enable ingress of the dissolved gas from the packaged beverage into the outer chamber 126 while restricting or throttling flow of the ingressed gas out of the outer chamber 126. The orientation of the tapering of the channel 152, and the dimensions of the first diameter, $d_1$, and the second diameter, $d_2$, may vary depending on the application, such as the type and amount of remediating component being released or the type of beverage into which the cartridge 101 is inserted. Additional considerations that may impact the orientation of the tapering of the channel 152 and the dimensions of the first diameter, $d_1$, and the second diameter, $d_2$, include manufacturing considerations. For example, it may be advantageous for the channel 152 to be tapered as illustrated in FIG. 8 for ease of production and tooling longevity.

The diameter of the pinhole orifice 134, in particular the channel 152 of the pinhole orifice 134, may be such to adequately restrict the flow of the ingressed gas out of the outer chamber 126 and cause the volumetric expansion of the ingressed gas at a force large enough to decouple the cap 104 from the body 102. If the pinhole orifice 134 has a diameter that is too large, when packaged beverage is opened the ingressed gas may simply flow out of the pinhole orifice 134 from the outer chamber 126. If the ingressed gas can freely flow out of the pinhole orifice 134, then there may not be enough backpressure retained by the outer chamber 126 to cause the cap 104 to decouple from the body 102. In contrast, if the pinhole orifice 134 has a diameter that is too small, then the cartridge 101 may not equalize with the packaged beverage fast enough to be activated in time for a consumer to open the packaged beverage or at all.

As such, the diameter or inner diameter of the pinhole orifice 134 (e.g., the channel 152), may be selected such to allow for ingress of dissolved gas at a rate that activates the cartridge 101 within a minute or less while restricting the outflow of the ingressed gas from the outer chamber 126 enough to maintain the pressure inside of the outer chamber 126. In some embodiments, the diameter of the pinhole orifice 134 may be in a range from 0.1 mm to 1.5 mm, from 0.2 mm to 1 mm, from 0.3 to 0.9 mm, from 0.4 mm to 0.8 mm, or 0.5 to 0.7 mm. In an example embodiment, the diameter of the pinhole orifice 134 may be 0.3 mm. In some embodiments, the diameter of the pinhole orifice 134 may correspond, in part, to the pressure of the packaged beverage. If the packaged beverage is at a higher pressure, then there will be a larger pressure differential when the beverage is opened. As such, the pinhole orifice 134 may be larger because there may be a larger volumetric expansion with the larger pressure differential. However, if the pressure differential is smaller (e.g., the packaged beverage has a lower pressure), then a smaller diameter pinhole orifice 134 may be required to maintain the higher pressure in the outer chamber 126, thereby ensuring enough backpressure in the outer chamber 126 when the ingressed gas undergoes volumetric expansion.

The diameter of the pinhole orifice 134 may be determined, at least in part, by the volume of the outer chamber 126 within the cartridge 101. As can be appreciated, there may be a direct correlation between the volume of the outer chamber 126 and the extent of volumetric expansion experienced by the ingressed gas upon activation of the cartridge 101. Specifically, the diameter of the pinhole orifice 134 influences the backpressure maintained within the outer chamber 126 during activation. Since the pressure within the outer chamber 126 is directly proportional to the volumetric expansion of the ingressed gas, the diameter of the pinhole orifice 134 may be linked to the volume of the outer chamber 126. For example, if the volume of the outer chamber 126 is 7000 mm³ (7 milliliters (ml)), then the diameter or orifice surface area of the pinhole orifice 134 may be 0.3 mm.

As shown by FIGS. 6-7, the cap 104 may contact an interior surface 154 of the outer wall 120 of the body 102. In particular, an attachment surface 156 of the cap 104 may contact the interior surface 154 of the outer wall 120. The attachment surface 156 may releasably secure the cap 104 to the body 102. To secure the cap 104 to the body 102, the attachment surface 156 may forme on the exterior surface 144 of the second side 140 such to insert into the outer chamber 126 when the cap 104 is positioned atop the body 102. When the cap 104 is positioned on the body 102, as illustrated, the attachment surface 156 may contact the interior surface 154 of the outer wall 120 and form a seal therebetween. Specifically, the attachment surface 156 may form a compression seal between the cap 104 and the body 102.

Figure 10:
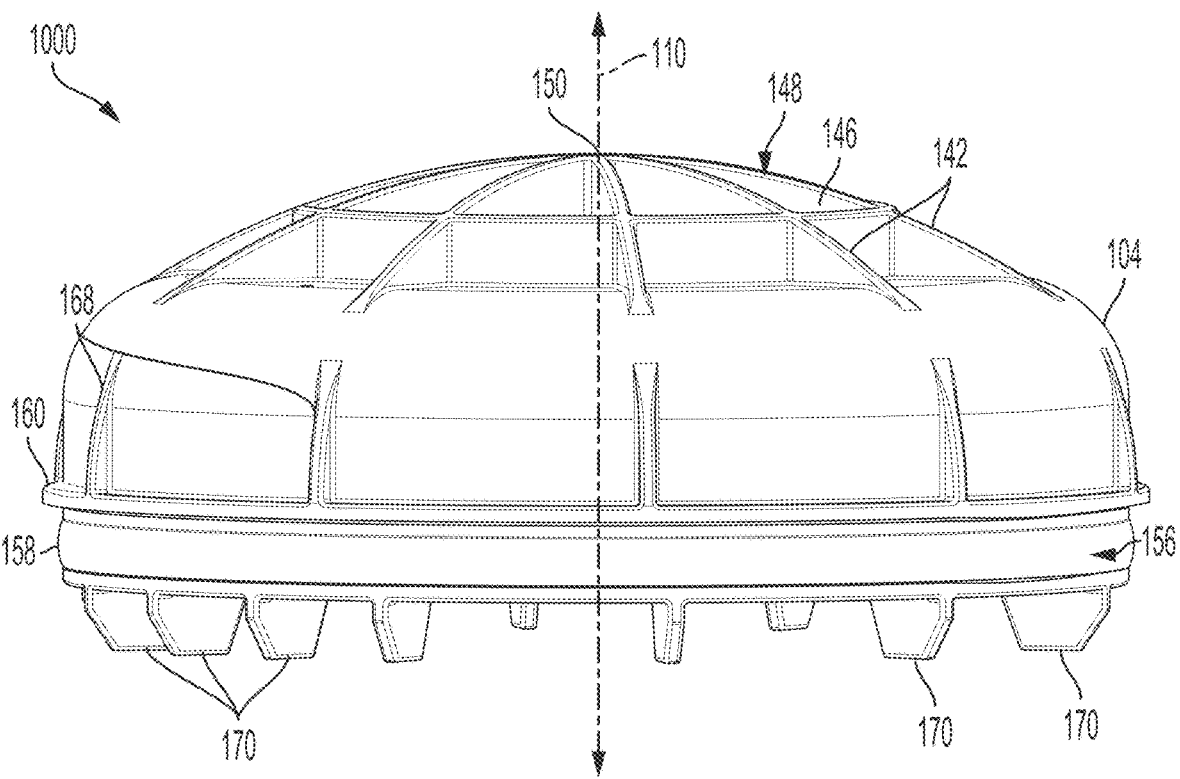

In some embodiments, such as illustrated by a perspective 1000 in FIG. 10, the attachment surface 156 may include a profile 158. The profile 158 may be a convex portion of the attachment surface 156 which extends along the x-axis away from the central axis 110 of the cap 104. The profile 158 may contact and press against the interior surface 154 of the outer wall 120 when the cap 104 is fitted to the body 102. In some embodiments, the compression seal may be formed between the profile 158 and the interior surface 154 of the outer wall 120. Although the profile 158 is shown as extending circumferentially about the exterior surface 144 of the second side 140 in a continuous manner that is orthogonal (e.g., perpendicular) to the central axis 110, in some embodiments the profile 158 may be formed as discrete segments. That is, instead of continuously extending circumferentially along the attachment surface 156, the profile 158 may include segments that have breaks therebetween. In other words, the profile 158 may be formed as nubs or bumps that are positioned circumferentially along the attachment surface 156.

In some embodiments, the cap 104 may include a lip 160. The lip 160 may be positioned on the second side of the cap 104 to seat on an end 162 of the outer wall 120. That is, when the cap 104 is fitted to the body 102 (e.g., positioned on the body 102 to form the cartridge 101), the lip 160 may contact the end 162 of the outer wall 120 to prevent the cap 104 from moving further along the central axis 110 towards the bottom end 114. If the embodiment of the cap 104 includes the lip 160, then the attachment surface 156 may be positioned lower on the central axis 110 than the lip 160 such that the attachment surface 156 is inserted into the body 102 when the lip 160 contacts the end 162 of the outer wall 120. As noted above, it should be appreciated that while the illustrated embodiments depict a radial seal formed between the cap 104 and the body 102, in other embodiments an axial or face seal may be formed between the cap 104 and the body 102.

As illustrated in FIG. 7, in some embodiments, the end 162 of the outer wall 120 may include a ramp 164. In particular, the ramp 164 may be formed between an exterior surface 166 and the interior surface 154 of the outer wall 120. The ramp 164 may aid in decoupling the cap 104 from the body 102 during activation of the cartridge 101 (e.g., when the packaged beverage is opened). For example, as the ingressed gas in the outer chamber 126 exerts a force on the cap 104, pushing the cap 104 away from the body 102 along the central axis 110, the profile 158 may slide along the ramp 164 to decouple the cap 104 from the body 102. The sloped surface of the ramp 164 from the interior surface 154 to the exterior surface 166 may facilitate the slide of the profile 158 along the outer wall 120 and aid the attachment surface 156 from releasing the seal formed with the interior surface 154 of the outer wall 120.

Figure 9:
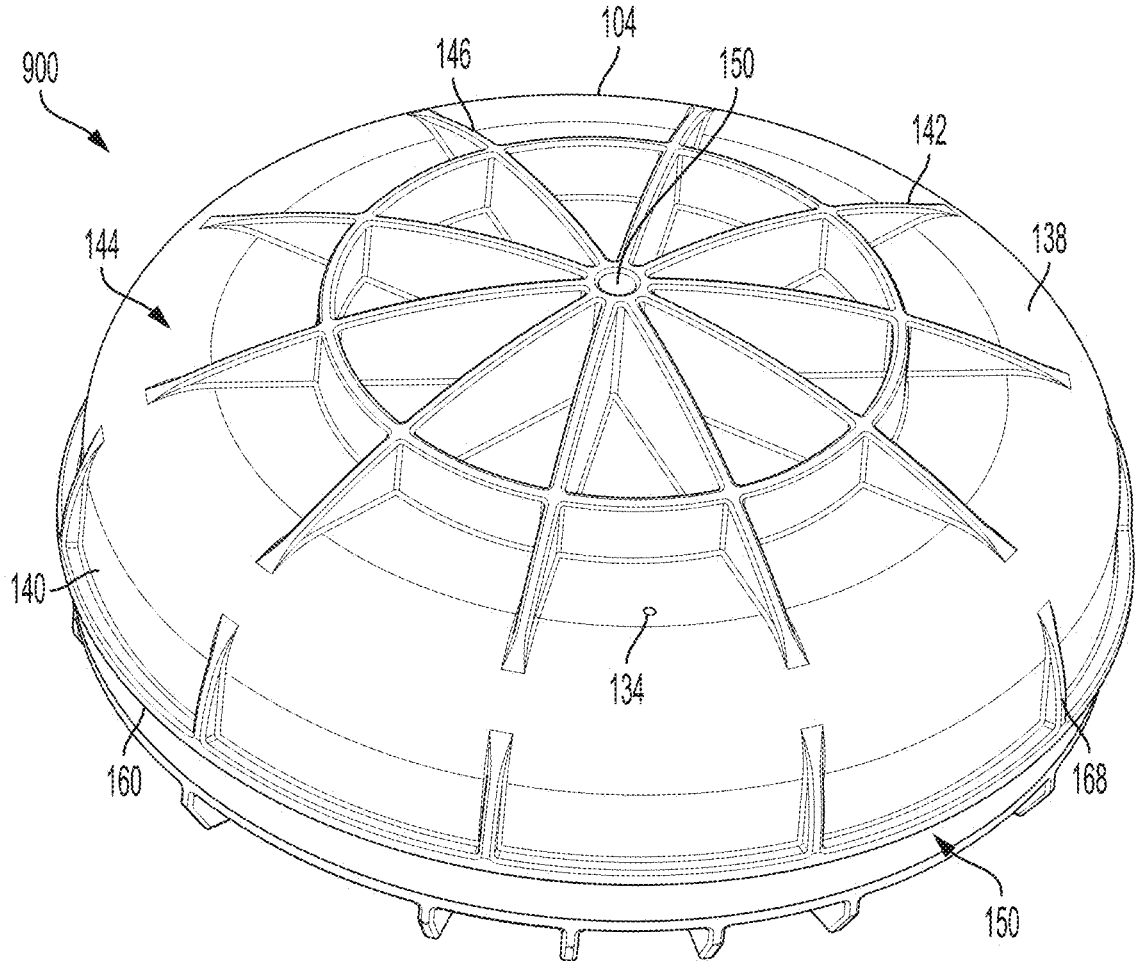
FIGS. 9-12B illustrate various perspectives of the cap of the cartridge from FIG. 1, according to an embodiment herein.

As illustrated in FIGS. 8 and 9, the cap 104 may include one or more ribs 168 positioned circumferentially about the second side 140. The ribs 168 may provide structural rigidity to the cap 104 along the second side 140. In particular, the ribs 168 may function to combat the forces exerted by the ingressed gas in the outer chamber 126 during activation (e.g., during volumetric expansion of the ingressed gas). As shown in the illustrated embodiment, the ribs 168 may be in contact with the lip 160 or as an integrated part with the lip 160. The ribs 168 may be uniformly spaced circumferentially about the exterior surface 144 of the second side 140.

Figure 11:
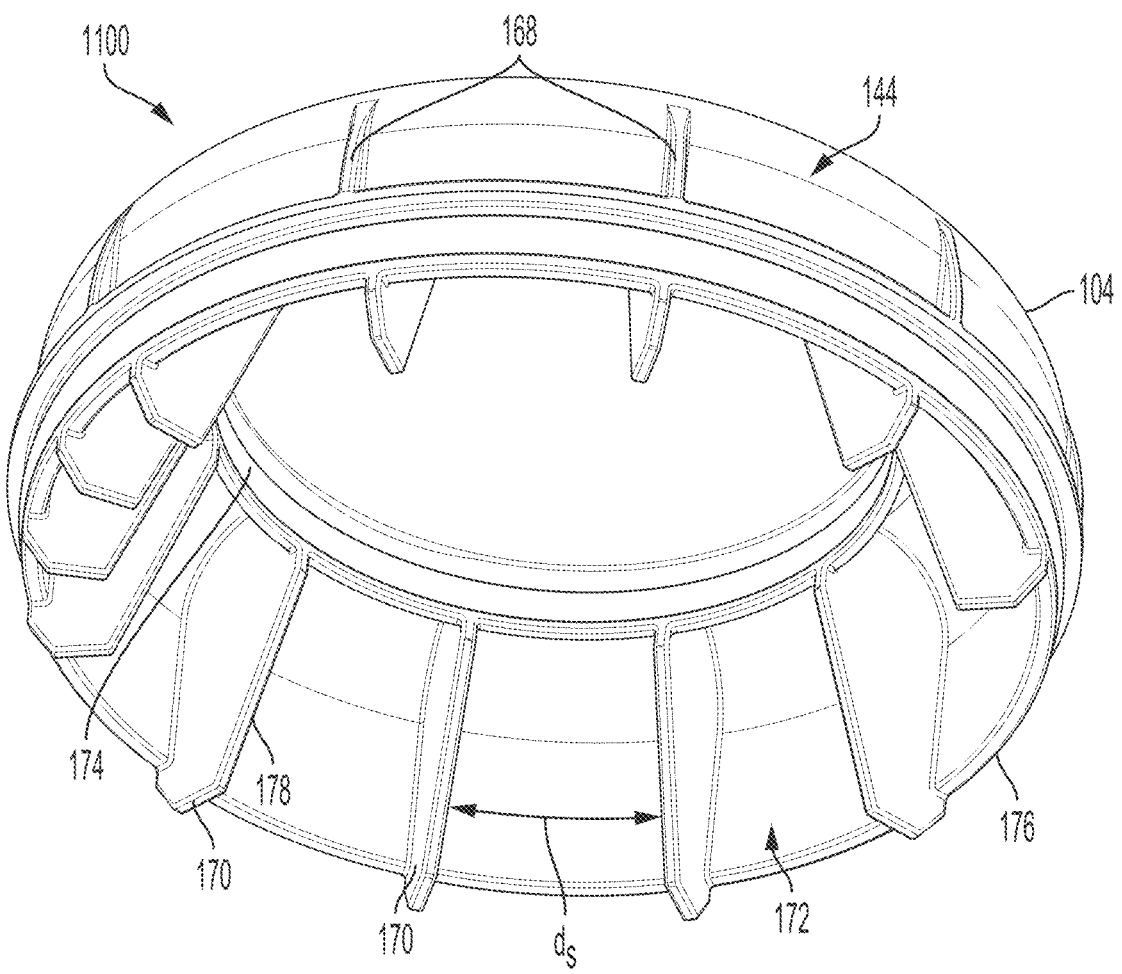

The cap 104 may include one or more inner stiffeners 170. As exemplified by perspective 1100 of FIG. 11, the inner stiffeners 170 may be positioned about an interior surface 172 of the cap 104. In particular, the inner stiffeners 170 may be positioned at a spacing distance, $d_S$, circumferentially about the interior surface 172. The inner stiffeners 170 may extend along the interior surface 172 to a third side 176 of the cap 104. In some embodiments, the third side 176 of the cap may be parallel to the first side 138 and/or orthogonal (e.g., perpendicular) to the second side 140 of the cap. As shown in FIG. 11, in some embodiments, the inner stiffeners 170 may extend from a reinforcement ring 174, which is described below, to the third side 176 of the cap 104. In some embodiments, the inner stiffeners 170 may extend beyond the third side 173, as illustrated in FIG. 7.

As shown in FIG. 11, the interior surface 172 of the cap 104 may include a reinforcement ring 174. The reinforcement ring 174 may extend towards the bottom end 114 of the body 102 along the central axis 110. In other words, the reinforcement ring 174 may extend away from the interior surface 172 of the cap 104 parallel to the central axis 110. In some embodiments, a portion of the reinforcement ring 174 extends into the outer chamber 126 and contacts the inner wall 122. As shown in FIG. 7, the reinforcement ring 174 may be inserted in the outer chamber 126 such to contact an exterior surface 180 of the inner wall 122. The exterior surface 180 of the inner wall 122 may be the surface of the inner wall 122 that faces the outer chamber 126.

The reinforcement ring 174 may include a sealing element 182 that creates an interference seal between the reinforcement ring 174 and the exterior surface 180 of the inner wall 122. For example, the sealing element 182 may be a slight inflection or slope of the reinforcement ring 174 along the surface that contacts the exterior surface 180 of the inner wall 122. In some embodiments, the sealing element 182 may include a sealing material, such as a rubber or soft plastic that creates a seal between the inner chamber 124 and the outer chamber 126. In other embodiments, the sealing element 182 is formed of the same material as the reinforcement ring 174 and/or the rest of the cartridge 101. It should be appreciated that while the illustrations and related description discusses the interference seal being formed between the exterior surface 180 of the inner wall 122 and the reinforcement ring 174, it should be appreciated that in some embodiments the interference seal may be formed between an interior surface 184 of the inner wall and the reinforcement ring 174. In such cases, the reinforcement ring 174 may be inserted, at least partially, into the inner chamber 124 instead of into the outer chamber 126.

Because the inner chamber 124 contains, during use of the cartridge 101, the remediating components, sealing the inner chamber 124 from the outer chamber 126 may be important to prevent leakage between the two chambers. That is, because the inner chamber 124 contains a non-gaseous component while the outer chamber 126 contains a gaseous component during use, preventing leakage between the two chambers may be important. For example, any leakage of the non-gaseous remediating component into the outer chamber 126 may impact the activation of the cartridge 101, such as obstructing the pinhole orifice 134. As can be appreciated, if the remediating component is an oil, such as a hop additive, and leaks into the outer chamber 126, when the cartridge 101 orients towards the bottom of the packaged beverage, the leaked oil may pool near or on the pinhole orifice 134. If the cartridge 101 has not yet been equalized to the packaged beverage pressure, the leaked oil may prevent the ingress of the dissolved gas.

Conversely, if the ingressed gas leaks into the inner chamber 124, then this could cause the cap 104 to decouple from the body 102 preemptively or before the consumer opens the packaged beverage. For example, since non-gaseous components, such as the remediating components have a different compression rate than gas, any slight changes in pressure may cause the leaked gas to expand in the inner chamber 124, thereby decoupling the cap 104 from the body 102. Moreover, any gas leaked into the inner chamber 124 may degrade the remediating components. For example, the remediating components, such as hop additive, may degrade in the presence of oxygen or carbon dioxide. As such, a gas that contains oxygen, such as dissolved gas, present in the inner chamber 124 may degrade the remediating components. Additional negative consequences of having gaseous components present in the inner chamber 124 are described in greater detail below.

In addition to preventing leakage between the inner chamber 124 and the outer chamber 126, the interference seal may have an interference fit that does not prevent decoupling of the cap 104 from the body 102. For example, if the interference seal has an interference fit that is too tight, then the cap 104 may not decouple from the body 102 during activation of the cartridge 101. As such, the interference seal formed between the reinforcement ring 174 and the inner wall 122 may have an interference fit of equal to or less than 0.1 micrometers (μm), equal to or less than 0.075 μm, equal to or less than 0.05 μm, or equal to or less than 0.025 μm.

As noted above, the cap 104 may include the inner stiffeners 170. The inner stiffeners 170 may provide structural support to the outer chamber 126 and may aid in the assembly process of the cartridge 101. As can be appreciated, the outer wall 120 and the inner wall 122 may be formed from thin material that may deform or flex during assembly. As such, fitting the cap 104 to the body 102, in particular inserting the attachment surface 156 and the reinforcement ring 174 into the outer chamber 126, may be difficult due to the flexing of the outer wall 120 and/or the inner wall 122. To provide rigidity and prevent the outer wall 120 and/or the inner wall 122 from flexing during the assembly process, the cap may include the inner stiffeners 170. In some embodiments, the inner stiffeners 170 may include a ramped edge 178. The ramped edge 178 may aid insertion of the inner stiffeners 170 into the outer chamber 126. For example, if the inner wall 122 is slightly flexed outwards during assembly, the ramped edge 178 of the inner stiffener 170 may catch the inner wall 122 and redirect the inner wall 12 into position.

In addition to providing structural rigidity to the outer chamber 126 and the cap 104, the inner stiffeners 170 may also function to prevent the inner wall 122 from flexing inwards into the inner chamber 124 during activation. When the cartridge 101 is activated and the ingressed gas undergoes volumetric expansion, the expanding gas may exert force in all directions, including onto the cap 104, the outer wall 120, and the inner wall 122. This force may cause the inner wall 122 to flex inwards as well as the outer wall 120 outwards (e.g., away from the inner chamber 124). By including the inner stiffeners 170, the inner wall 122 may be supported and the force of the expanding gas may be redirected, in part, to the outer wall 120. Because the outer wall 120 can freely flex outwards, when the cartridge 101 is activated, the expanding gas may flex the outer wall 120 outwards, thereby aiding in the release of the attachment surface 156 from the interior surface 154 of the outer wall 120. As can be appreciated, flexing the outer wall 120 outwards may release the seal formed at the attachment surface 156, thereby allowing the cap 104 to decouple at lower pressures than if the seal was maintained.

Figure 12A:
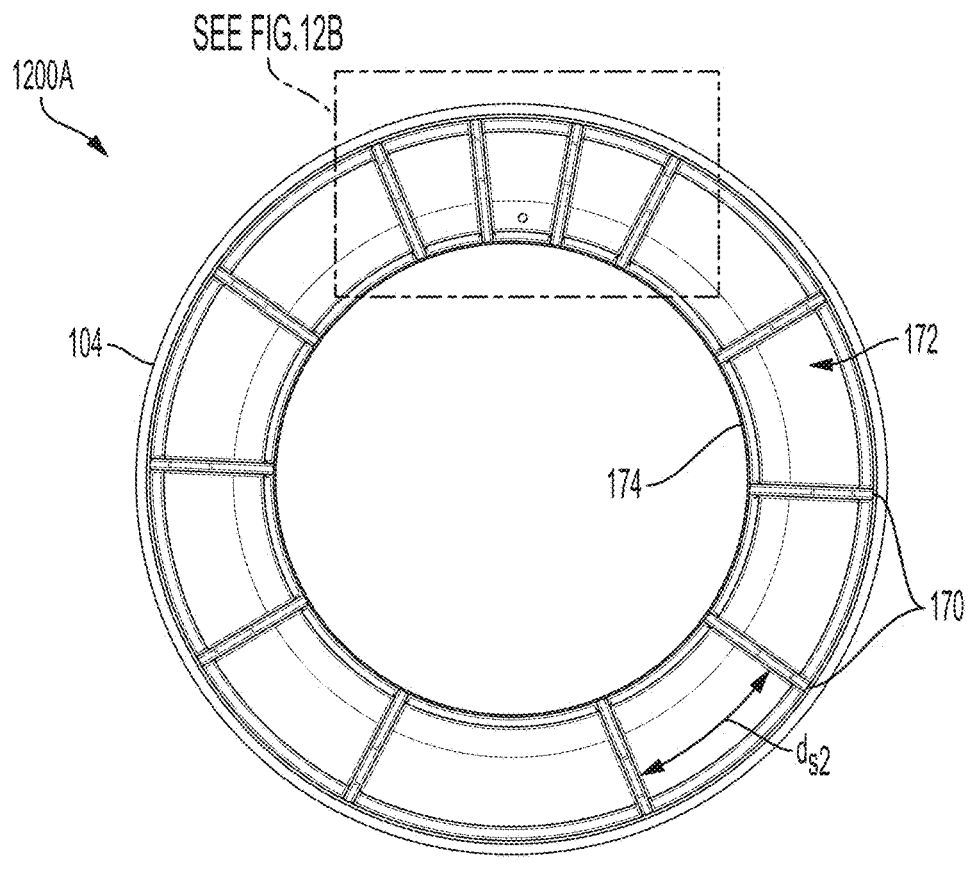
Figure 12B:
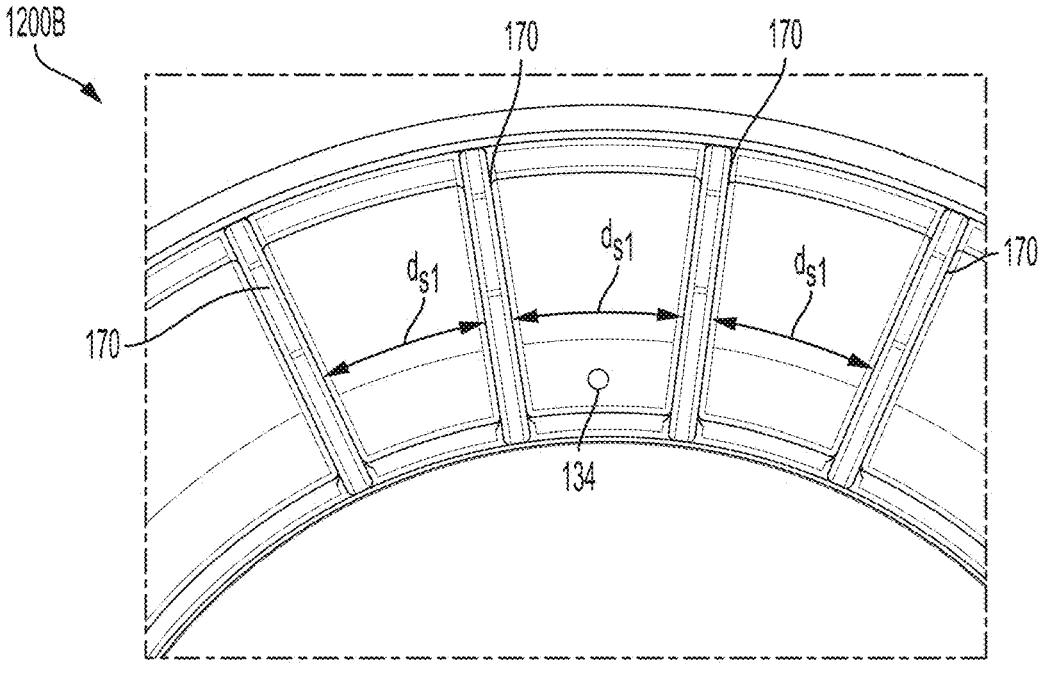

Referring now to FIGS. 12A-B, in some embodiments the inner stiffeners 170 may be positioned about the interior surface 172 such to have a different spacing distance, $d_S$, around the pinhole orifice 134. As shown, around the pinhole orifice 134, the inner stiffeners 170 may be positioned at a first spacing distance, $d_{S1}$, while the remaining inner stiffeners 170 that are further from the pinhole orifice 134 may have positioned at a second spacing distance, $d_{S2}$. The first spacing distance, $d_{S1}$, may be less than the second spacing distance, $d_{S2}$, such that there is a greater density of inner stiffeners 170 proximal to the pinhole orifice 134.

The first spacing distance, $d_{S1}$, may be less than the second spacing distance, $d_{S2}$, to position more inner stiffeners 170 proximate to the pinhole orifice 134. This may cause the cartridge 101 to orient the pinhole orifice 134 towards a bottom of the packaged beverage. Orienting the pinhole orifice 134 towards the bottom of the packaged beverage may serve multiple functions. One function may be orienting the pinhole orifice 134 towards the bottom of the packaged beverage may prevent plugging of the pinhole orifice 134 by particulate or suspended solids that may be present in the beverage (e.g., an unfiltered IPA). When the pinhole orifice 134 is oriented downwards, the domed structure 146 may prevent the pinhole orifice 134 from contacting the bottom of the packaged beverage and prevent larger particles from reaching the pinhole orifice 134.

Another function of orienting the pinhole orifice 134 downwards is to aid in the activation of the cartridge 101. When the dissolved gas ingresses into the outer chamber 126, components of the beverage may be entrained. As such, there may be a small amount of the beverage that ingresses into the outer chamber 126 along with the ingressed gas. When the cartridge 101 is oriented downwards, the higher density of inner stiffeners 170 proximate to the pinhole orifice 134 may cause the pinhole orifice 134 to be the low point in the outer chamber 126. As such, the entrained beverage may pool around the pinhole orifice 134. The first spacing, $d_{S1}$, of the inner stiffeners 170 may act to prevent the pooling beverage from dispersing away from the pinhole orifice 134. By pooling the entrained beverage around and on the pinhole orifice 134, the volumetric expansion of the ingressed gas may be enhanced. As those skilled in the art readily appreciate, during volumetric expansion, the ingressed gas may try to flow out of the pinhole orifice 134, however, the pooling beverage, being a liquid, may prevent the outward flow of the ingressed gas. In other words, the entrained beverage may act as a plug when pooled over the pinhole orifice 134. In some cases, pooling the beverage over the pinhole orifice 134 may double the efficiency of the volumetric expansion or activation of the cartridge 101.

Referring now to FIG. 13, a perspective 1300 of the cartridge 101 including a stillwand 186 is illustrated, according to an embodiment herein. For example, the interior surface 172 may include a stillwand 186 (e.g., stir stick or rod) to aid in dispersing the remediating components out of the inner chamber 124. The stillwand 186 may be positioned to insert into the inner chamber 124 when the cap 104 is fitted to the body 102. In particular, the stillwand 186 may be positioned to insert into the remediating components housed within the inner chamber 124. When the cap 104 decouples from the body 102, the stillwand 186 may function to suction or pull the remediating components out of the inner chamber 124. As noted above, the remediating components may be a viscous material, such as an oil, meaning that the remediating components may resist flow. As such, even when the cap 104 decouples from the body 102 and the inner chamber 124 is exposed to the packaged beverage, the remediating components may not freely flow into the packaged beverage. The stillwand 186 may aid in releasing and flowing the remediating components into the packaged beverage upon activation of the cartridge 101. In some embodiments, there may be more than one stillwand 186, such as two or more stillwands 186, three or more stillwands 186, four or more stillwands 186, or five or more stillwands 186.

The stillwand 186 may have a length, L, that does not impede the decoupling of the cap 104 from the body 102. For example, if the stillwand 186 has a length, L, that is too great, then the stillwand 186 may catch on the inner wall 122 when the cap 104 is released. In some cases, catching of the stillwand 186 on the inner wall 122 may prevent complete decoupling of the cap 104 from the body 102 and impede release of the remediating components in the packaged beverage. As such, the stillwand 186 may have a length in a range from 2 mm to 20 mm, from 5 mm to 20 mm, from 10 mm to 20 mm, or from 10 mm to 15 mm. In some embodiments, instead of a straight stillwand 186, as illustrated, the stillwand 186 may have a curvature or spiral, such as having a corkscrew shape. Depending on the viscosity and composition of the remediating component, the stillwand's 186 shape and/or curvature may aid in mixing the remediating components with the packaged beverage upon release.

The perspective 1300 of the cartridge 101 also illustrates that in some embodiments the outer chamber 126 and the inner chamber 124 may have two different bottom walls. As illustrated, the outer chamber 126 may have an outer bottom wall 188 and the inner chamber 124 may have an inner bottom wall 190, the outer bottom wall 188 at a different height along the central axis 110 than the inner bottom wall 190. In some embodiments, it may be beneficial to fill the inner chamber 124 with the remediating components as close to full as possible. That is, it may be advantageous to fill the inner chamber 124 only with non-gaseous components (e.g., the remediating components) because any gas in the inner chamber 124 may cause the center of gravity of the cartridge 101 to shift. As described above, when the cartridge 101 is inserted into the packaged beverage, the cartridge 101 may be designed to orient the cap 104 downwards. Orienting the cap 104 downwards or towards the bottom of the packaged beverage may ensure that the pinhole orifice 134 is positioned within the beverage, thereby ensuring that the dissolved gas can ingress into the outer chamber 126 and the cartridge equilibrize to the pressure of the packaged beverage. If there is gas in the inner chamber 124 this may prevent the cartridge 101 from orienting the pinhole orifice 134 downwards, thereby preventing the cartridge 101 from equalizing with the pressure of the packaged beverage.

Moreover, if there is an airhead in the inner chamber 124 (e.g., gas components in the inner chamber 124 along with the remediating components), this may degrade the remediating components. For example, the remediating components, such as hop additive, may degrade in the presence of oxygen. As such, a gas that contains oxygen, such as air, present in the inner chamber 124 may degrade the remediating components. As will be described in greater detail below with respect to FIGS. 14-15, if the inner chamber 124 is completely filled with a remediating component, the compressibility of the component may negatively impact the sealing process when closing the cap 104. As such, in some embodiments, the cap 104 may include an excess gas chamber or pocket.

Furthermore, the presence of gas in the inner chamber 124 may negatively affect the decoupling of the cap 104 from the body 102. For example, if the cartridge 101 is prepared/activated at a higher elevation, such as in Denver, Colorado, but the packaged beverage is opened and consumed at sea level, such as in San Diego, California, the pressure differential between gas within the inner chamber 124 and the higher atmospheric pressure may limit the release of the cap 104. In other words, any gas within the inner chamber 124 when prepared at a higher elevation may maintain the lower pressure (due to the higher elevation) when the cartridge 101 is inserted into the packaged beverage. If the packaged beverage is opened at a lower elevation, thus having a higher atmospheric pressure than the pressure of the gas in the inner chamber 124, this may cause an additional 1-3 psi of pressure that is required to be overcome for the cap 104 to decouple from the body 102.

To ensure that the inner chamber 124 is filled to a desired fill volume (e.g., max fill volume), an amount of remediating components may be added to the inner chamber to reach the desired fill volume. If the amount of remediating component to be released in the packaged beverage is less than the amount needed to reach the desired fill volume, then water or another inert component may be added to the remediating components to achieve the desired fill volume of the inner chamber 124. In other cases, instead of diluting the remediating components, the inner bottom wall 190 of the inner chamber 124 may be raised to reduce the volume of the inner chamber 124 to the desired volume of remediating components, such as is illustrated in FIG. 13.

Referring now to FIGS. 14-20, another example cartridge 1401 is illustrated, according to various embodiments herein. The example cartridge 1401 may be the same or substantially similar to the cartridge 101. As such, the cartridge 1401 includes the body 102 and the cap 104, as well as various other components, such as the inner chamber 124 and the outer chamber 126. The cartridge 1401 may illustrate additional components, such as an excess gas chamber 1475, in the cap 104, a hinge 1416, one or more cutouts 1477, and a rounded bottom 1531, each of which is described in turn below.

As described above, it may be desirable to completely fill the inner chamber 124 with remediating component. In such cases, however, the compressibility of the remediating component may negatively impact the sealing process when closing the cap 104. This may occur because compressible materials can create resistance or backpressure, making it difficult to achieve a secure closure and potentially leading to leaks or improper sealing. To address this issue, in some embodiments, the cap 104 may include the excess gas chamber 1475. The excess gas chamber 1475 allows the inner chamber 124 to be fully filled while still accommodating any expansion or compression of the remediating component during the closure process, ensuring a secure and effective seal.

As illustrated, the excess gas chamber 1475 may be formed approximately centered in the cap 104 such to align with the central axis 110 of the cartridge 1401. To form the excess gas chamber 1475 in the cap 104, a reinforcement ring 1474, which may be the same or similar to the reinforcement ring 174, may extend from the cap 104 towards the inner chamber 124, when the cartridge 1401 is in a closed position. A surface 1473 may be formed between an opening of the excess gas chamber 1475 and the reinforcement ring 1474.

Figure 16:
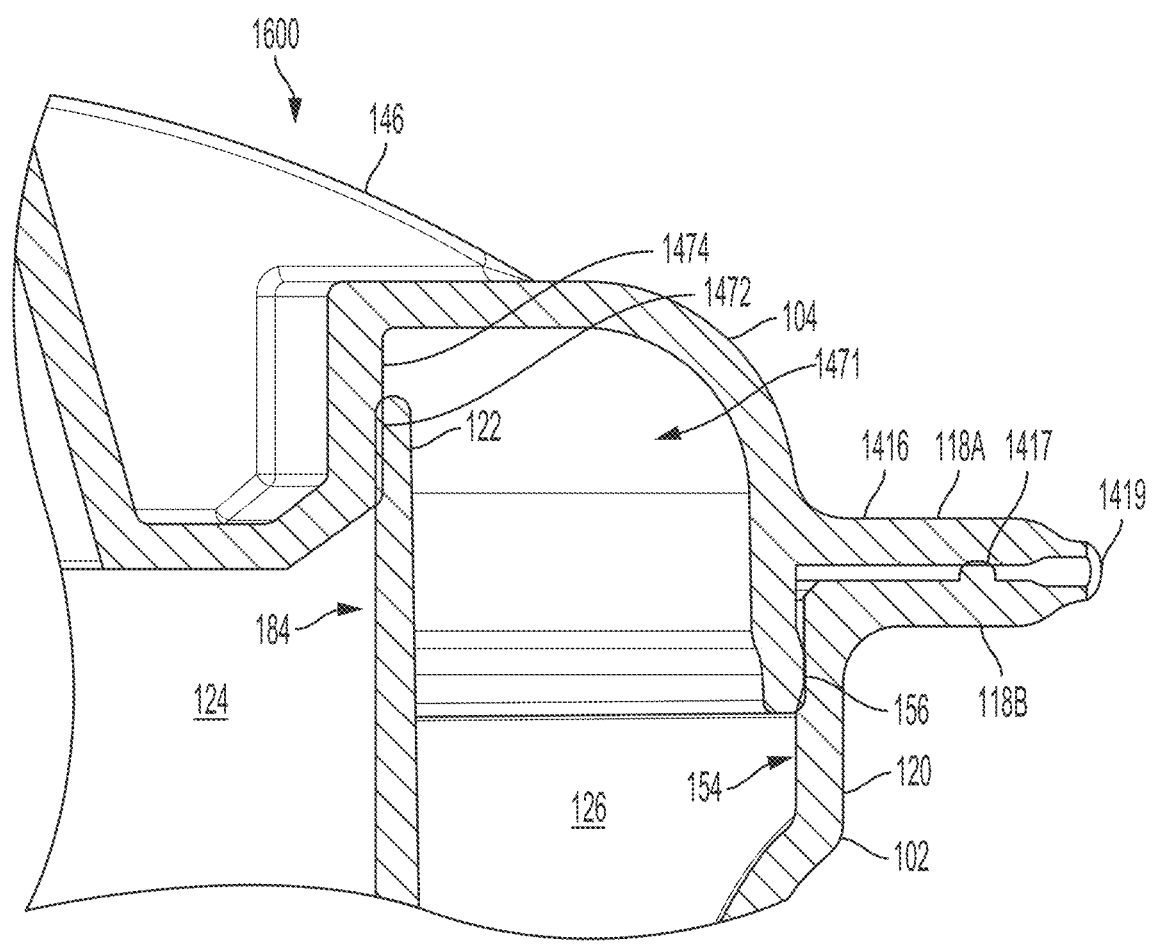
FIG. 16 illustrates a cross-sectional perspective of the cartridge from FIG. 14 in a closed position, according to an embodiment herein.

As illustrated in FIG. 16, which provides a cross-sectional perspective view 1600 of the cartridge 1401 in a closed position, when the cap 104 is secured to the body 102, the surface 1473 may face or otherwise be directed towards the inner chamber 124. The presence of the excess gas chamber 1475 within the cap 104 may form an annular space 1471 in the cap 104 as well. As depicted, when the cap 104 is secured to the body 102, the annular space 1471 aligns with the outer chamber 126. Additionally, when in the closed position, an interior surface 1472 of the reinforcement ring 1474, which may be the same or similar to the interior surface 172, may create a seal with the interior surface 184 of the inner wall 122 of the inner chamber 124, as described above.

Figure 15:
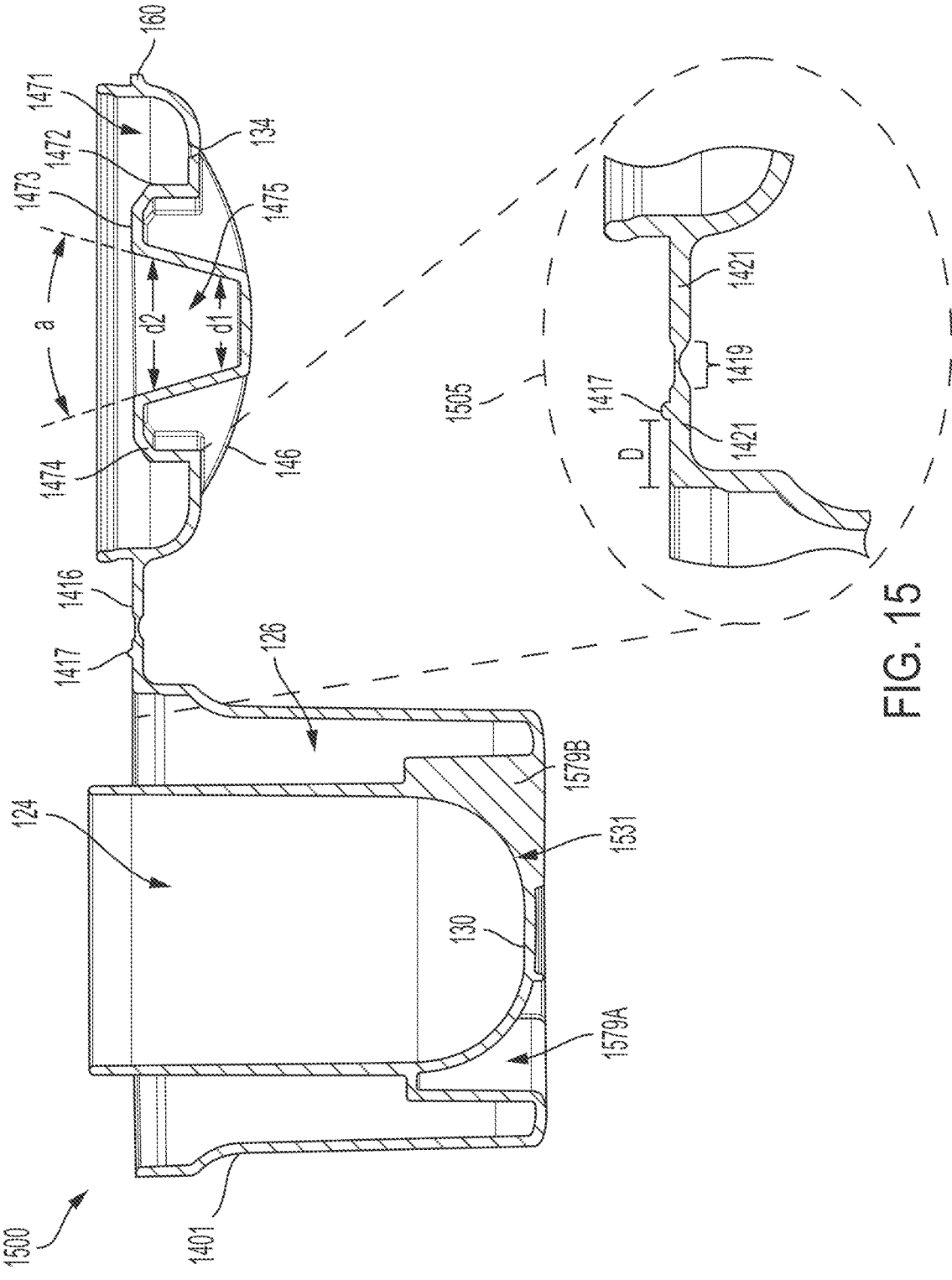
FIG. 15 illustrates a cross-sectional perspective of the cartridge from FIG. 14 in an open position, according to an embodiment herein.

With reference to FIG. 15, which provides a cross-sectional perspective 1500 of the cartridge 1401, the excess gas chamber 1475 may have a slightly conical shape to accommodate or otherwise align with the domed structure 146 of the cap 104. In such cases, the excess gas chamber 1475 may include a first diameter, $d_1$, and a second diameter, $d_2$, as illustrated. The first diameter, $d_1$, and the second diameter, $d_2$, along with a depth of the excess gas chamber 1475 may result in an opening angle, a, of the excess gas chamber 1475. In some embodiments, the opening angle, a, may be 30°, while in other embodiments, the opening angle, a, may be 20°, 25°, 35°, 40°, or 45°. The opening angle, a, facilitates release of the remediating component by, for example, decreasing the amount of "weaving" required for the remediating component to flow from the inner chamber 124 to the external environment, thereby reducing the time it takes for the remediating component to mix into the packaged beverage. It should be appreciated that while the illustrated examples illustrate the excess gas chamber 1475 as conical shaped, in other embodiments, the excess gas chamber 1475 may be cylindrically shaped, domed shaped, or any other shape.

The cartridge 1401 also includes the hinge 1416, which may be the same or similar to the hinge 116 in that it provides a mechanism allowing the cap 104 to securably release from the body 102. With reference to FIG. 15, the hinge 1416 includes a ridge 1417 that aids in the release of the cap 104 from the body 102. When the cap 104 is affixed to the body 102 and the inner chamber 124 is filled with remediating components, various physical forces may resist the cap's 102 release. One such force arises from the potential formation of a partial vacuum within the inner chamber 124 due to the settling or compaction of the remediating components, which can create negative pressure against the cap 104, increasing the force required to disengage it. Additionally, in environments where the cartridge 1401 is inserted into a packaged beverage at low temperatures, thermal contraction of the polymeric material composing the hinge 1416 may occur. This contraction can reduce the hinge's 1416 elasticity and compromise its ability to return to its original open position due to decreased molecular mobility and increased material stiffness at lower temperatures.

To counteract these physical forces resisting the cap's 102 release, the hinge 1416 includes the ridge 1417. As illustrated in perspective view 1505, the hinge assembly 1416 comprises a primary segment 1421, into which a thinned segment 1419 is integrated. The segment 1421 may structurally correspond to both the first side 118A and the second side 118B of the hinge 1416, providing anchoring points on either end. The thinned segment 1419 functions as the flexible joint that interconnects the first side 118A and the second side 118B, facilitating controlled articulation.

The thinned segment 1419 is specifically engineered to act as the flexural zone of the hinge 1416, permitting deflection and bending when the cap 104 is engaged with the body 102. To enhance its flexibility, the thinned segment 1419 has a reduced cross-sectional thickness relative to the adjacent segment 1421. This localized reduction in material thickness decreases the bending stiffness, thereby allowing the hinge to deform more easily under load while maintaining structural integrity. The material composition of the hinge 1416 may be a polymeric or elastomeric compound, optimized for repeated flexure without significant fatigue failure. Additionally, the transition between the thinned segment 1419 and the segment 1421 may incorporate a gradual taper to distribute stress and minimize localized stress concentrations, which could otherwise lead to premature failure The ridge 1417 is strategically positioned on the primary segment 1421, located either on the first side 118A or the second side 118B, depending on the hinge 1416 configuration. As illustrated, the ridge 1417 is placed at a distance, D, along the primary segment 1421, extending towards the thinned segment 1419. The placement of the ridge 1417 influences the mechanical response of the hinge 1416 when the cap 104 is secured to or released from the body 102. Specifically, as the distance, D, increases, the ridge 1417 engages with the hinge 1416 mechanism in a manner that increases the resistance to flexing at the thinned segment 1419. This results in a higher reactive force opposing deformation when the cap 104 is being opened. The ridge 1417 functions as a mechanical stop or fulcrum, amplifying the force needed to disengage the cap 104 by introducing a localized resistance point along the hinge.

Additionally, the ridge 1417 may serve to pre-load the hinge 1416 in a partially stressed state when the cap 104 is closed, enhancing the snap-fit retention between the cap 104 and body 102. The material selection and geometric profile of the ridge 1417 can further refine its influence on the hinge's 1416 mechanical behavior and optimizing durability. In some cases, instead of the illustrated configuration that includes the ridge 1417, the hinge 1416 may be a butterfly hinge that incorporates a dual-flexure design or an over-center mechanism to generate a restoring force. This design allows the hinge 1416 to store potential energy when the cap 104 is in the closed position and then release it upon actuation, effectively overcoming any counter forces resisting the cap's 104 movement. By doing so, the butterfly hinge facilitates a smoother and more controlled release of the cap 104 from the body 102, enhancing usability and reducing the effort required for disengagement.

As described above, the inner chamber 124 is filled with remediating components that rejuvenate a beverage upon decoupling of the cap 104 from the body 102. As such, the cartridge may undergo a filling process during which one or more remediating components are inserted or otherwise placed into the inner chamber 124. Depending on the viscosity of the remediating components, splash back may occur, resulting in a portion of the remediating component inadvertently spilling or spraying out of the inner chamber 124. To prevent splash back, as well as provide aid in release of the remediating component as described above, the inner chamber 124 may include a rounded bottom 1531, as depicted in FIG. 15. As shown, the bottom wall 130 of the inner chamber 124 may include a rounded bottom 1531. The rounded bottom surface 1531 may reduce the amount of splash back during filling of the inner chamber 124 as well as reduce adherence of remediating components to the bottom wall 130, as described above.

The rounded bottom 1531 of the bottom wall 130 may create a void 1579A within the cartridge 1401, specifically between the outer chamber 126 and the inner chamber 124. In some cases, rather than leaving this space empty, it may be filled with a material 1579B. This material 1579B could serve various purposes, such as providing structural support or enhancing thermal insulation. The choice between maintaining a void 1579A or incorporating a filler material 1579B may depend on factors such as the desired performance characteristics, the nature of the remediating component, or manufacturing considerations.

Figure 17:
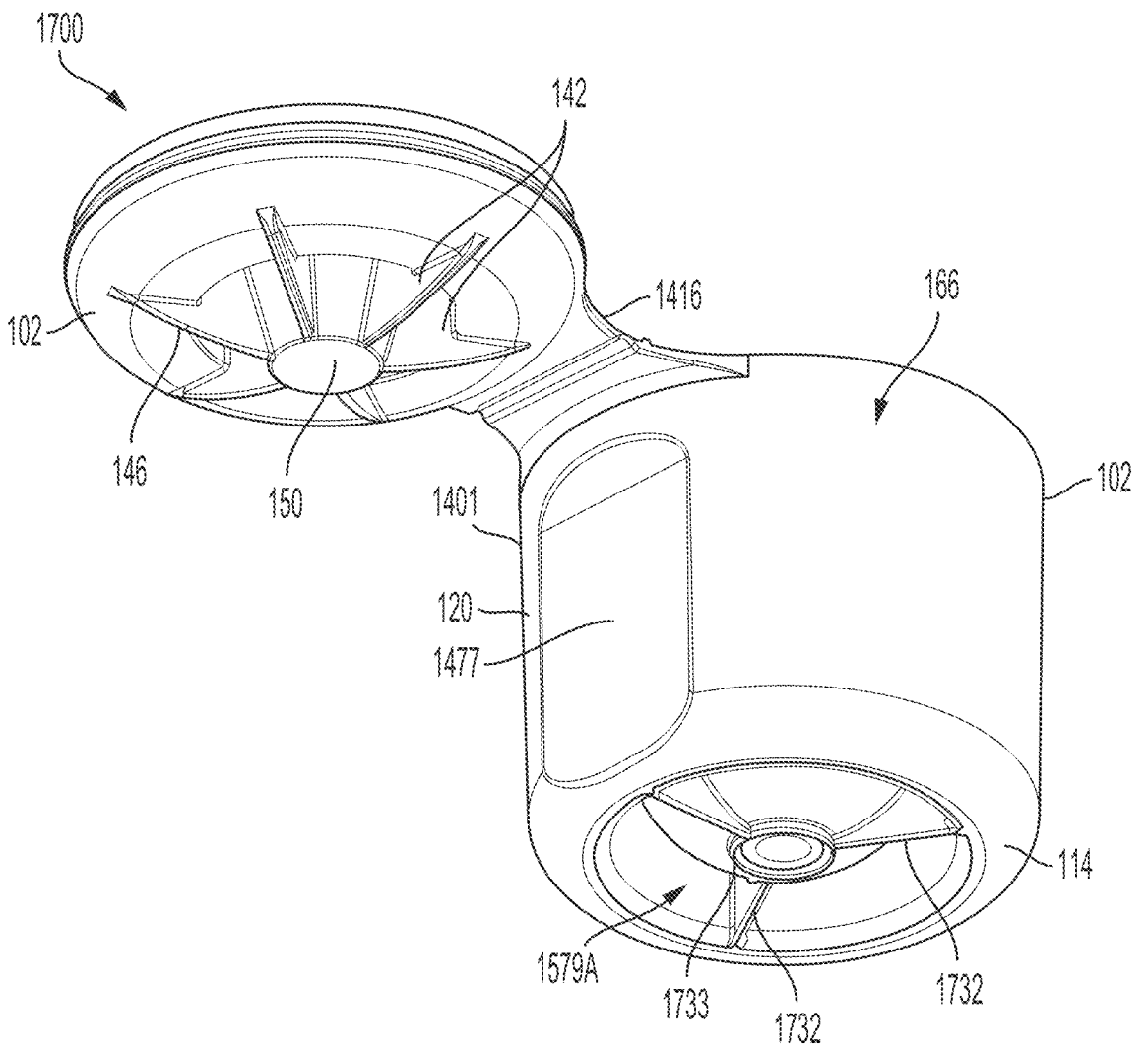
FIG. 17 illustrates an isometric perspective of the cartridge from FIG. 14, according to an embodiment herein.

Referring now to FIG. 17, an isometric perspective 1700 of the cartridge 1401 is provided, according to an embodiment herein. The perspective 1700 illustrates the bottom end 114 of the body 102, which features the voids 1579A formed by the rounded bottom 1531 of the inner chamber 124. In some embodiments, the bottom end 114 incorporates one or more bottom stiffeners 1732, which may be the same or similar to the bottom stiffeners 132 discussed above. The bottom stiffeners 1732 provide added structural integrity, helping to resist deformation under pressure or external forces. Additionally, the bottom end 114 includes a gate 1733, which serves to further reinforce the bottom section of the body 102. The gate 1733 not only enhances the overall strength and rigidity of the bottom end but also aids in ensuring proper alignment during manufacturing and assembly.

Figure 18:
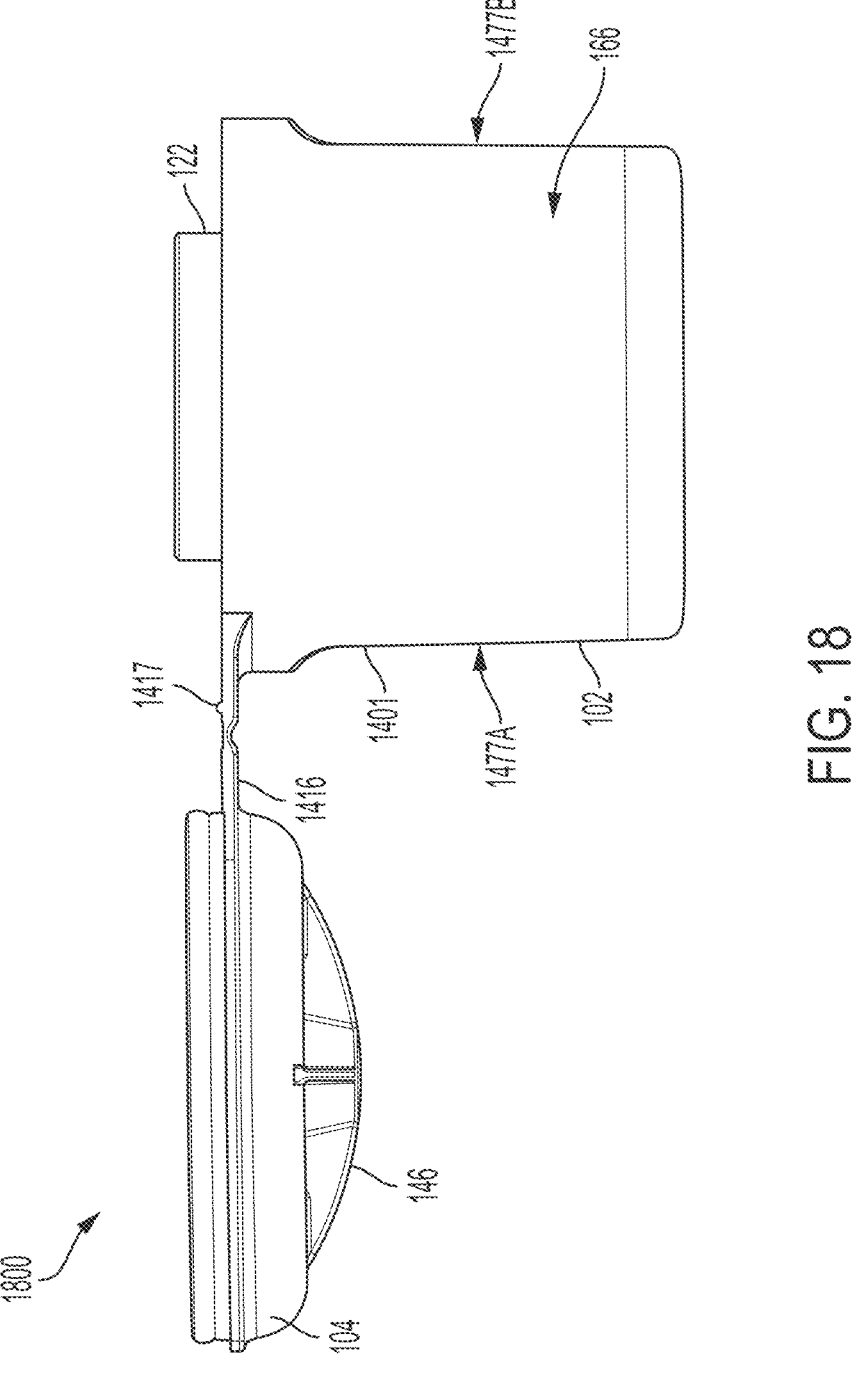
FIG. 18 illustrates a side-view perspective of the cartridge from FIG. 14, according to an embodiment herein.

The perspective 1700 also illustrates the cutout 1477 formed as part of the body 102. The cartridge 1401 may include one or more cutouts 147 formed as part of the outer wall 120 of the body 102. The cutouts 1477 may aid in alignment and orientation of the cartridge 1401 during manufacturing and assembly processes, such as ensuring that the cap 104 is in correct alignment for closure. FIG. 18 illustrates a side-view perspective 1800 of the cartridge 1401 including two cutouts 1477A and the 1477B. The cutouts 1477A and 1447B may be positioned on the body 102 to ensure the cartridge 1401 is aligned properly as needed during manufacturing and assembly. The cutouts 1477 may also reduce the weight of the cartridge 1401 and volume displacement of the cartridge 1401 within the packaged beverage. The size and configuration of the cutouts 1477 may vary depending on the manufacturing process, assembly processes, and/or design of the cartridge 1401.

Figure 19:
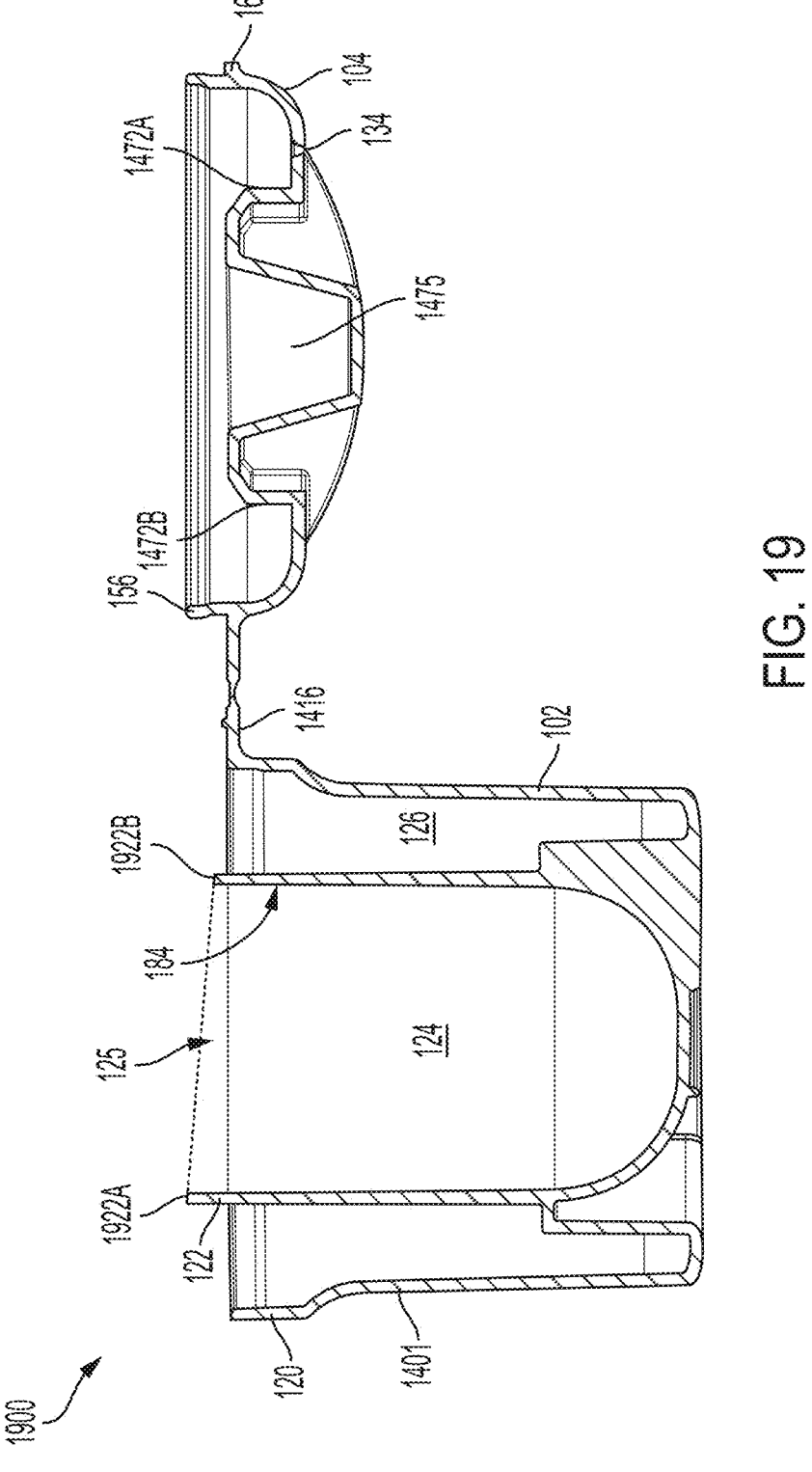
FIG. 19 illustrates a cross-sectional perspective of the cartridge from FIG. 14 having an inclined inner wall, according to an embodiment herein.

Referring now to FIG. 19, a cross-sectional perspective 1900 of the cartridge 1401 having an inclined inner wall 122 is illustrated. As shown, the inner wall 122 of the inner chamber 124 may include a first side 1922A and a second side 1922B. The second side 1922B may be oriented closest to the hinge 1416 and the first side 1922A may be oriented opposite to the second side 1922B. The first side 1922A may have a first height that is greater than a second height of the second side 1922B. The height of the inner wall 122 may slope from the first side 1922A to the second side 1922B, thereby forming an inclined inner wall 122.

The inclined inner wall 122 may aid in releasing the cap 104 from the body 102. As described above, when the cartridge 1401 is in the closed position, various forces can impact the release of the cap 104 from the body 102, one of which is the friction formed between the cap 104 and the body 102. As shown in FIG. 16, when in the closed position, the interior surface 184 of the inner wall 122 contacts with the interior surface 1472 of the reinforcement ring 1474. The height of the inner wall 122, particularly near the hinge 1416, plays a significant role in determining the frictional forces involved. The greater the height of the inner wall 122, the more contact is made between the interior surfaces 184 and 1472, which increases friction and makes it more difficult to release the cap 104. By designing the inner wall 122 with a sloped or inclined height—particularly with the second side 1922B of the inner wall 122 having a reduced height—friction between the inner surfaces is minimized. This inclined shape allows for a smoother transition and easier release of the cap 104, as it reduces the amount of contact and friction that would otherwise occur at the hinge 1416 region. The inclined inner wall 122 helps to mitigate the resistance and facilitates a more efficient uncoupling of the cap 104 from the body 102.

Figure 20:
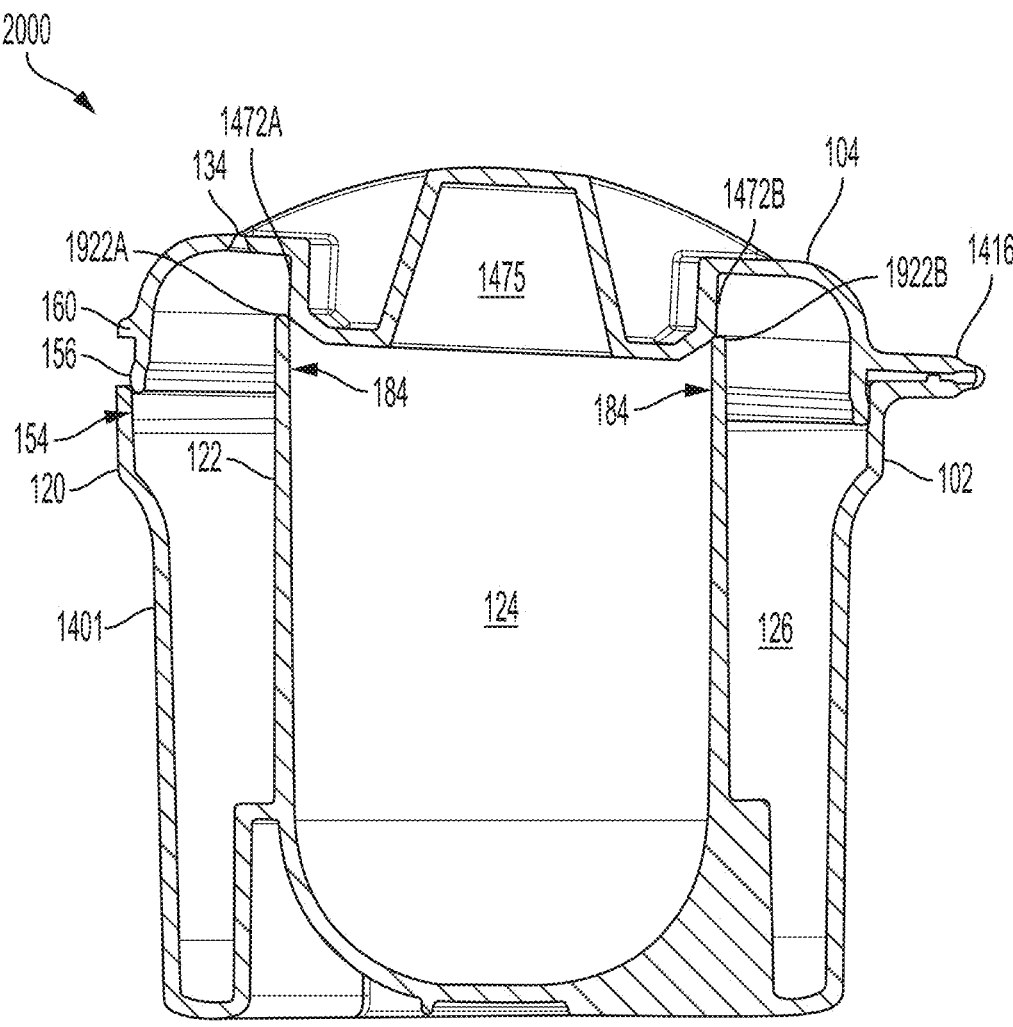
FIG. 20 illustrates a perspective of the cartridge from FIG. 19 having the inclined inner wall in a near-closed position, according to an embodiment herein.

Referring now to FIG. 20, a perspective 2000 of the cartridge 1401 is illustrated, showing the inclined inner wall 122 in a near-closed position. As depicted, when the cap 104 is being secured to the body 102, the interior surface 1472A of the cap 104 contacts the first side 1922A of the inner wall 122. This occurs approximately simultaneously with the contact of the interior surface 1472B of the cap 104 with the second side 1922B of the inner wall 122. The key to this timing is the difference in height between the first side 1922A and the second side 1922B of the inner wall 122. If the height of the second side 1922B were equal to that of the first side 1922A, the contact sequence would be altered. Specifically, the interior surface 1472B of the cap 104 would make contact with the interior surface 184 of the second side 1922B earlier than the interior surface 1472A would contact the first side 1922A, as the inner wall 122 would have a more uniform height, creating less of a gradual slope. This earlier contact could introduce uneven pressure distribution, increasing the friction and resistance during the securing process. By incorporating a reduced height in the second side 1922B, the design allows the two interior surfaces 1472A and 1472B to engage with the inner wall 122 in a more balanced and controlled manner, optimizing the sealing process while minimizing friction during the final stages of closure as well as during the release of the cap 104 from the body 102.

Figure 21:
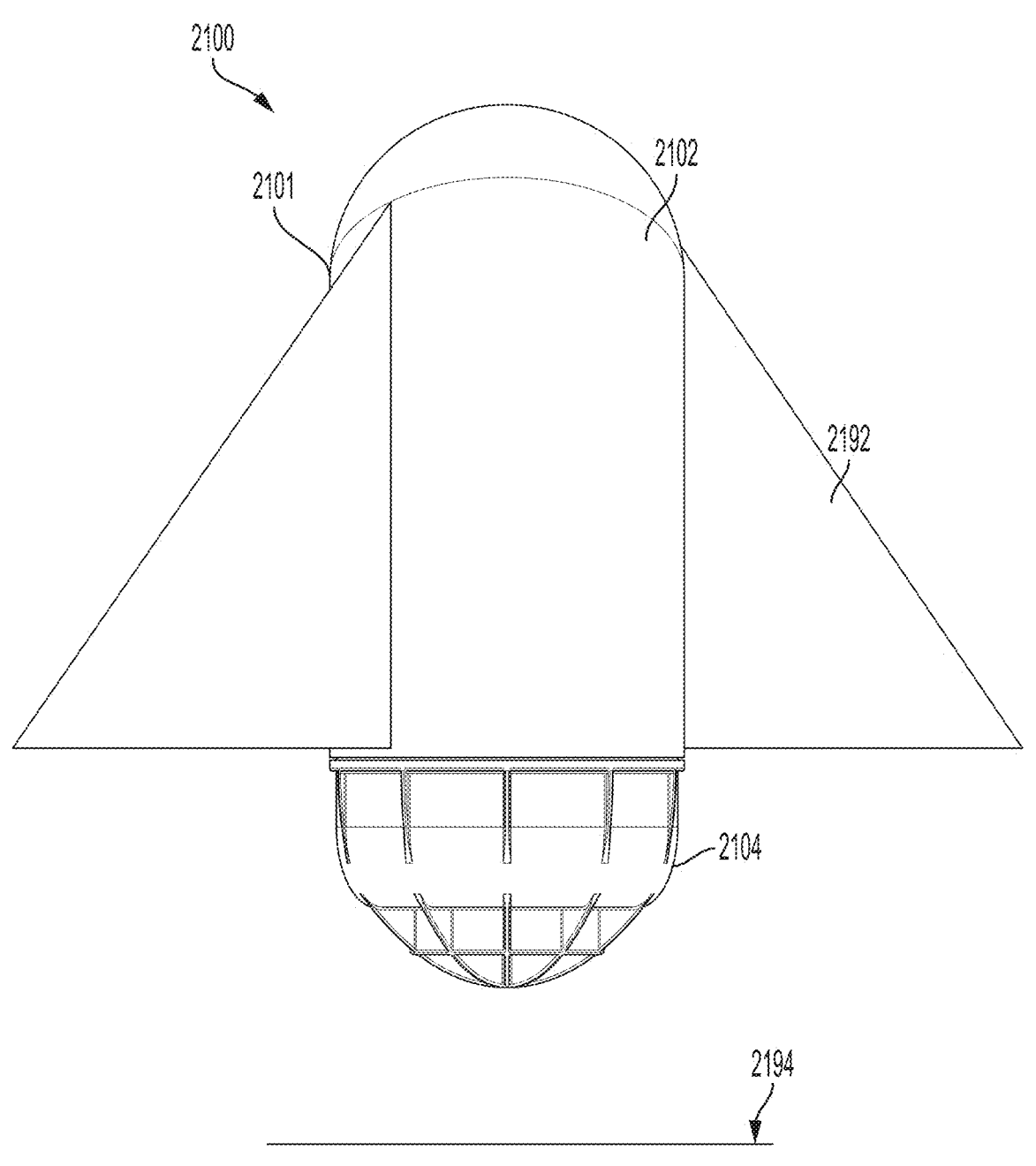
FIG. 21 illustrates an example cartridge having wing tabs, according to an embodiment herein.

Referring now to FIG. 21, an example cartridge 2101 is illustrated, according to an embodiment herein. As shown, the cartridge 2101 includes an elongate body 2102 and a cap 2104, which may be the same or similar to the body 102 and the cap 104. The cartridge 2101 is illustrated in an orientation that the cartridge 2101 may achieve when inserted into the packaged beverage. For example, the cap 2104 is illustrated oriented downwards and directed towards a bottom surface 2194 of the packaged beverage. In some embodiments, the cartridge 2101 may be inserted into the packaged beverage in this orientation. For example, if the cartridge 2101 is inserted into a beer bottle or a packaged beverage that does not have a width or configuration that allows the cartridge 2101 to freely move and orient itself downwards, the cartridge 2101 may be inserted into the packaged beverage such to orient the cap 2104 towards the bottom surface 2194 of the packaged beverage.

In some embodiments, the cartridge 2101 may include one or more wing tabs 2192. The wing tabs 2192 may be configured to collapse or otherwise fold around the cartridge 2101 upon insertion into the packaged beverage and then unfold or expand once inserted. When the wing tabs 2192 expand, the wing tabs 2192 may prevent the cartridge 2101 from moving within the packaged beverage. That is, the wing tabs 2192, once expanded may secure the cartridge's 2101 position within the packaged beverage. This may ensure that the cartridge 2101 stays in a downward position. The wing tabs 2192 may also prevent the cartridge 2101 from obstructing a mouthpiece of the packaged beverage. For example, if the cartridge 2101 is inserted into a beer bottle, then without the wing tabs 2192, the cartridge 2101 may flow out of the beer bottle mouthpiece when a consumer drinks the beer. As can be appreciated, this may not only negatively impact the consumer's experience, but it may also be dangerous (e.g., the cartridge 2101 may be a choking hazard). As such, the wing tabs 2192 may prevent the cartridge 2101 from moving when the packaged beverage is tipped up during consumption.

It should be appreciated that while the wing tabs 2192 are illustrated as solid, in some embodiments, the wing tabs 2192 may be formed as a skeleton structure, such to minimize impact on fluid flow within the packaged beverage during consumption while maintaining the cartridge 2101 in a secure position. In some embodiments, the wing tabs 2192 may be formed from the same material as the cartridge 2101, while in other embodiments, the wing tabs 2192 may be formed of different material to aid in their expansion or unfurling.

Referring now to FIGS. 22A and 22B, perspectives 2200A and 2200B are provided respectively, according to an embodiment herein. In particular, the perspectives 2200A and 2200B illustrate a cartridge 2201 prior to and during activation within a packaged beverage 2296. The cartridge 2201 may be the same or similar to the cartridge 101 or 2101, such as including a body 2202 and a cap 2204. As illustrated, when the cartridge 2201 is introduced into the packaged beverage 2296, the cartridge 2201 may orient towards a bottom surface 2294 of the packaged beverage 2296. In particular, the cartridge 2201 may orient the cap 2204 towards the bottom surface 2294. As described above, the orientation of the cartridge 2201 may be due to various features of the cartridge 2201, such as having a domed structure like the domed structure 146.

As illustrated by arrows 2298 in the perspective 2200A, dissolved gas may flow or ingress into the cartridge 2201 to activate the cartridge 2201. The arrows 2298 may indicate the flow of dissolved gas from the packaged beverage 2296 into an outer chamber, such as the outer chamber 126, within the cartridge 2201. Although not visible, dissolved gases may be flowing through a pinhole orifice present in the cap 2204 and into the cartridge 2201. As described above, to facilitate activation of the cartridge 2201, the pinhole orifice may be oriented towards the bottom surface 2294 of the packaged beverage 2296. As such, the arrows 2298 may indicate the flow of dissolved gas into the pinhole orifice present at the point of the cap 2204 oriented towards the bottom surface 2294.

The perspective 2200B illustrates activation of the cartridge 2201. In particular, arrows 2299 illustrate the flow of remediating components being released from cartridge 2201. As described above, an inner chamber (not shown) of the cartridge 2201 may house remediating components and release the components upon opening of the packaged beverage 2296. The packaged beverage 2296 may be opened in the perspective 2200B, as indicated by a tab 2297. As such, when the packaged beverage 2296 is opened, the cartridge 2201 may activate and release the remediating components, as shown by the arrows 2299.

As illustrated by the arrows 2299, orienting the cartridge 2201, in particular the cap 2204 towards the bottom surface 2294 may aid in releasing the remediating components. For example, because the cartridge 2201 is oriented downwards, when the remediating components are released out of the inner chamber (e.g., the inner chamber 124), the remediating components may hit the bottom surface 2294 and deflect off, thereby achieving a mixing effect. Moreover, as a consumer drinks the packaged beverage 2296, the consumer often lifts the bottom of the packaged beverage 2296 upwards, meaning that the releasing remediating components may mix further as the consumer drinks. In part, by releasing the remediating components near the bottom surface 2294, the remediating components have longer to mix with the packaged beverage 2296 before being consumed. This can prevent a user from ingesting or tasting the remediating components in an unmixed state, which may be an undesirable experience.

The foregoing examples and descriptions are described herein in the context of systems and methods for providing a cartridge for releasing remediating components into a packaged beverage upon consumption. Those of ordinary skill in the art will realize that these descriptions are illustrative only and are not intended to be in any way limiting. Reference is made in detail to implementations of examples as illustrated in the accompanying drawings. The same reference indicators are used throughout the drawings and the description to refer to the same or like items.

In the interest of clarity, not all of the routine features of the examples described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. That is, the foregoing description of some examples has been presented only for the purpose of illustration and description and is not intended to be exhaustive or to limit the disclosure to the precise forms disclosed. Numerous modifications and adaptations thereof will be apparent to those skilled in the art without departing from the spirit and scope of the disclosure.

Reference herein to an example or implementation means that a particular feature, structure, operation, or other characteristic described in connection with the example may be included in at least one implementation of the disclosure. The disclosure is not restricted to the particular examples or implementations described as such. The appearance of the phrases "in one example," "in an example," "in an embodiment," or "in an implementation," or variations of the same in various places in the specification does not necessarily refer to the same example or implementation. Any particular feature, structure, operation, or other characteristic described in this specification in relation to one example or implementation may be combined with other features, structures, operations, or other characteristics described in respect of any other example or implementation.

Use herein of the word "or" is intended to cover inclusive and exclusive OR conditions. In other words, A or B or C includes any or all of the following alternative combinations as appropriate for a particular usage: A alone; B alone; C alone; A and B only; A and C only; B and C only; and A and B and C.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all the following interpretations of the word: any of the items in the list, all the items in the list, and any combination of the items in the list.

The above Detailed Description of examples of the technology is not intended to be exhaustive or to limit the technology to the precise form disclosed above. While specific examples for the technology are described above for illustrative purposes, various equivalent modifications are possible within the scope of the technology, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or sub combinations. Each of these processes or blocks may be implemented in a variety of different ways. Also, while processes or blocks are at times shown as being performed in series, these processes or blocks may instead be performed or implemented in parallel, or may be performed at different times. Further any specific numbers noted herein are only examples: alternative implementations may employ differing values or ranges.

The teachings of the technology provided herein can be applied to other systems, not necessarily the system described above. The elements and acts of the various examples described above can be combined to provide further implementations of the technology. Some alternative implementations of the technology may include not only additional elements to those implementations noted above, but also may include fewer elements.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects may likewise be embodied as a computer-readable medium claim, or in other forms, such as being embodied in a means-plus-function claim. Any claims intended to be treated under 35 U.S.C. § 112(f) will begin with the words "means for" but use of the term "for" in any other context is not intended to invoke treatment under 35 U.S.C. § 112(f). Accordingly, the applicant reserves the right to pursue additional claims after filing this application to pursue such additional claim forms, in either this application or in a continuing application.

EXAMPLES

These illustrative examples are mentioned not to limit or define the scope of this disclosure, but rather to provide examples to aid understanding thereof. Illustrative examples are discussed above in the Detailed Description, which provides further description. Advantages offered by various examples may be further understood by examining this specification.

As used below, any reference to a series of examples is to be understood as a reference to each of those examples disjunctively (e.g., "Examples 1-4" is to be understood as "Examples 1, 2, 3, or 4").

Aspect 1 is a cartridge for releasing at least one remediating component into a packaged beverage, the cartridge comprising: a cylindrical body having a top end and a bottom end, the cylindrical body comprising: an outer wall extending from the bottom end towards the top end; an inner wall extending from the bottom end towards the top end, wherein: the inner wall forms an inner chamber and an outer chamber; and the outer chamber comprises an annulus space circumferentially about the inner chamber, a bottom wall forming a bottom surface of the inner chamber and the outer chamber, wherein the bottom end comprises the bottom wall, wherein: the inner chamber comprises an opening at the top end; and the outer chamber comprises an annulus opening at the top end; a cap configured to releasably secure to the top end of the cylindrical body, wherein the cap comprises: a first side and a second side, wherein the second side is approximately orthogonal to the first side, each of the first side and the second side comprising an interior surface opposing an exterior surface, wherein: the second side comprises an attachment surface; and the attachment surface releasably attaches the cap to the outer wall of the cylindrical body; and a pinhole orifice extending between the interior surface and the exterior surface of the first side, wherein the pinhole orifice comprises a channel between the inner chamber and an environment exterior to the cartridge.

Aspect 2 is the cartridge of any previous or subsequent aspect, wherein the pinhole orifice comprises a diameter of 0.3 millimeters (mm).

Aspect 3 is the cartridge of any previous or subsequent aspect, wherein the cylindrical body comprises a plurality of stiffeners circumferentially positioned about the bottom wall, wherein the plurality of stiffeners extends along at least of a portion of the bottom surface of the outer chamber and at least a portion of the bottom surface of the interior surface.

Aspect 4 is the cartridge of any previous or subsequent aspect, wherein the inner wall comprises a first height and the outer wall comprises a second height, wherein the first height is greater than the second height.

Aspect 5 is the cartridge of any previous or subsequent aspect, wherein the cap comprises a stillwand extending into the inner chamber when the cap is secured to the top end of the cylindrical body.

Aspect 6 is the cartridge of any previous or subsequent aspect, wherein the attachment surface comprises a profile extending circumferentially about the exterior surface of the second side, wherein the profile contacts an interior surface of the outer wall of the cylindrical body to form a compression seal between the outer wall and the attachment surface.

Aspect 7 is the cartridge of any previous or subsequent aspect, wherein the interior surface of the first side of the cap comprises a sealing element extending approximately perpendicular to the first side towards the bottom end of the cylindrical body, wherein the sealing element contacts the inner wall of the cylindrical body to form an interference seal between the sealing element and the inner wall to form the inner chamber.

Aspect 8 is the cartridge of any previous or subsequent aspect, wherein the annulus space of the outer chamber comprises a volume proportional to an amount of energy required to release the cap from the cylindrical body based on a pressure of the packaged beverage into which the cartridge is introduced.

Aspect 9 is the cartridge of any previous or subsequent aspect, wherein the cap comprises a plurality of inner stiffeners, wherein each of the inner stiffeners extends inwards from the interior surface into the annulus space of the outer chamber, wherein a first subset of the plurality of inner stiffeners is positioned on the interior surface proximate to the pinhole orifice such to weight the cap towards the pinhole orifice.

Aspect 10 is the cartridge of any previous or subsequent aspect, wherein the cap comprises a domed structure having a plurality of top stiffeners, wherein the plurality of top stiffeners comprises a mass such that when the cartridge is introduced into the packaged beverage the cap orients downwards towards a bottom of the packaged beverage and the bottom end of the cylindrical body orients upwards towards a top of the packaged beverage.

Aspect 11 is the cartridge of any previous or subsequent aspect, where the cartridge further comprises a hinge attached on a first end to the cap and on a second end to the cylindrical body.

Aspect 12 is a system for releasing one or more non-gaseous remediating components into a packaged beverage upon opening of the packaged beverage, the system comprising: a cartridge comprising a cap and a cylindrical body, wherein the cap is releasably secured to a top end of the cylindrical body, wherein: the cylindrical body comprises an inner chamber and an outer chamber, both extending from the top end towards a bottom end of the cylindrical body, wherein: the outer chamber forms an annulus space about the inner chamber; the annulus space of the outer chamber fills with gas when the outer chamber reaches a pressure equilibrium with the packaged beverage, the gas being dissolved gas from the packaged beverage; and the inner chamber comprises the one or more non-gaseous remediating components; and the cap comprises a pinhole orifice configured to restrict fluid flow between the outer chamber and an environment external to the cartridge such that when the packaged beverage is opened, the pinhole orifice restricts the gas within the outer chamber from flowing to the environment external, thereby causing rapid volumetric expansion of the gas in the outer chamber, wherein the rapid volumetric expansion of the gas causes the cap to decouple from the top end of the cylindrical body thereby releasing the non-gaseous remediating components into the packaged beverage.

Aspect 13 is the system of any previous or subsequent aspect, wherein: the outer chamber comprises an outer wall having an interior surface and an exterior surface; and the cap comprises an attachment element, wherein the attachment element forms a compression seal between the cap and the interior surface of the outer wall.

Aspect 14 is the system of any previous or subsequent aspect, wherein the cartridge comprises a unibody forming the cylindrical body and the cap.

Aspect 15 is the system of any previous or subsequent aspect, wherein the cap comprises a plurality of stiffeners, wherein the stiffeners are configured to cause pinhole orifice to orient towards a bottom of the packaged beverage.

Aspect 16 is the system of any previous or subsequent aspect, wherein the cap comprises a plurality of inner stiffeners positioned about an interior surface proximate to the pinhole orifice, wherein the plurality of inner stiffeners is configured to pool entrained beverage around the pinhole orifice.

Aspect 17 is the system of any previous or subsequent aspect, wherein the one or more non-gaseous remediating components comprise one or more of: a flavor-enhancing additive; a citrus additive; a hop additive; an herb additive; salt; or baking soda.

Aspect 18 is the system of any previous or subsequent aspect, wherein an interior surface of the cap comprises a reinforcement ring extending towards the bottom end of the cylindrical body, wherein the reinforcement ring contacts an exterior surface of the inner chamber to form an interference seal between the inner chamber and the outer chamber.

Aspect 19 is the system of any previous or subsequent aspect, wherein the cap comprises a dome structure and is configured to orient towards a bottom of the packaged beverage such that the dome structure prevents obstruction of the pinhole orifice.

Aspect 20 is the system of any previous or subsequent aspect, wherein the cartridge comprises a plurality of wing tabs that are configured to contact an interior surface of the packaged beverage and limit movement of the cartridge within the packaged beverage.

What is claimed is:

1. A cartridge for releasing at least one remediating component into a packaged beverage, the cartridge comprising:

a cylindrical body having a top end and a bottom end, the cylindrical body comprising:
an outer wall extending from the bottom end towards the top end;
an inner wall extending from the bottom end towards the top end, wherein:
the inner wall forms an inner chamber and an outer chamber; and
the outer chamber comprises an annulus space circumferentially about the inner chamber,
a bottom wall forming a bottom surface of the inner chamber and the outer chamber, wherein the bottom end comprises the bottom wall, wherein:
the inner chamber comprises an opening at the top end; and
the outer chamber comprises an annulus opening at the top end;
a cap configured to releasably secure to the top end of the cylindrical body, the cap comprising:
a first side and a second side, wherein the second side is approximately orthogonal to the first side, each of the first side and the second side comprising an interior surface opposing an exterior surface, wherein:
the second side comprises an attachment surface; and
when the cap is releasably secured to the top end, the attachment surface releasably attaches the cap to the outer wall of the cylindrical body and the inner chamber is isolated from an environment exterior to the cartridge; and
a pinhole orifice extending between the interior surface and the exterior surface of the first side, wherein the pinhole orifice comprises a restricted cross-sectional area forming a channel between the outer chamber and the environment exterior to the cartridge, wherein the restricted cross-sectional area of the pinhole orifice is dimensioned to:
permit ingress of gas dissolved in the packaged beverage into the outer chamber until a pressure equilibrium is achieved between the outer chamber and the packaged beverage; and
restrict outflow of the gas from the outer chamber until the packaged beverage is opened such that volumetric expansion of the gas within the outer chamber promotes decoupling of the cap from the cylindrical body.

2. The cartridge of claim 1, wherein the pinhole orifice comprises a diameter of 0.3 millimeters (mm).

3. The cartridge of claim 1, wherein the cylindrical body comprises a plurality of stiffeners circumferentially positioned about the bottom wall, wherein the plurality of stiffeners extends along at least of a portion of the bottom surface of the outer chamber and at least a portion of the bottom surface of the interior surface.

4. The cartridge of claim 1, wherein the inner wall comprises a first height and the outer wall comprises a second height, wherein the first height is greater than the second height.

5. The cartridge of claim 1, wherein the cap comprises a stillwand extending into the inner chamber when the cap is secured to the top end of the cylindrical body.

6. The cartridge of claim 1, wherein the attachment surface comprises a profile extending circumferentially about the exterior surface of the second side, wherein the profile contacts an interior surface of the outer wall of the cylindrical body to form a compression seal between the outer wall and the attachment surface.

7. The cartridge of claim 1, wherein the interior surface of the first side of the cap comprises a sealing element extending approximately perpendicular to the first side towards the bottom end of the cylindrical body, wherein the sealing element contacts the inner wall of the cylindrical body to form an interference seal between the sealing element and the inner wall to form the inner chamber.

8. The cartridge of claim 1, wherein the annulus space of the outer chamber comprises a volume proportional to an amount of energy required to release the cap from the cylindrical body based on a pressure of the packaged beverage into which the cartridge is introduced.

9. The cartridge of claim 1, wherein the cap comprises a plurality of inner stiffeners, wherein each of the inner stiffeners extends inwards from the interior surface into the annulus space of the outer chamber, wherein a first subset of the plurality of inner stiffeners is positioned on the interior surface proximate to the pinhole orifice such to weight the cap towards the pinhole orifice.

10. The cartridge of claim 1, wherein the cap comprises a domed structure having a plurality of top stiffeners, wherein the plurality of top stiffeners comprises a mass such that when the cartridge is introduced into the packaged beverage the cap orients downwards towards a bottom of the packaged beverage and the bottom end of the cylindrical body orients upwards towards a top of the packaged beverage.

11. The cartridge of claim 1, where the cartridge further comprises a hinge attached on a first end to the cap and on a second end to the cylindrical body.

12. A system for releasing one or more non-gaseous remediating components into a packaged beverage upon opening of the packaged beverage, the system comprising:
    a packaged beverage;
    a cartridge inserted into the packaged beverage, the cartridge comprising a cap and a cylindrical body, wherein the cap is releasably secured to an open top end of the cylindrical body, wherein:
        the cylindrical body comprises:
            an inner chamber and an outer chamber, both extending from the open top end towards a bottom end of the cylindrical body, wherein:
            the outer chamber forms an annulus space about the inner chamber;
            the annulus space of the outer chamber fills with gas when the outer chamber reaches a pressure equilibrium with the packaged beverage, the gas being dissolved gas from the packaged beverage; and, a bottom wall forming a bottom surface of the inner chamber and the outer chamber, wherein the bottom end comprises the bottom wall;
        the cap isolates the inner chamber from an environment external to the cartridge;
        the inner chamber comprises the one or more non-gaseous remediating components; and
    the cap comprises a pinhole orifice configured to restrict fluid flow through a restricted cross-sectional area forming a channel between the outer chamber and the environment external to the cartridge, such that when the packaged beverage is opened, the pinhole orifice restricts the gas within the outer chamber from flowing to the environment external to the cartridge, thereby causing rapid volumetric expansion of the gas in the outer chamber, wherein the rapid volumetric expansion of the gas causes the cap to decouple from the top end of the cylindrical body thereby releasing the one or more non-gaseous remediating components into the packaged beverage.

13. The system of claim 12, wherein:
    the outer chamber comprises an outer wall having an interior surface and an exterior surface; and
    the cap comprises an attachment element, wherein the attachment element forms a compression seal between the cap and the interior surface of the outer wall.

14. The system of claim 12, wherein the cartridge comprises a unibody forming the cylindrical body and the cap.

15. The system of claim 12, wherein the cap comprises a plurality of stiffeners, wherein the stiffeners are configured to cause the pinhole orifice to orient towards a bottom of the packaged beverage.

16. The system of claim 12, wherein the cap comprises a plurality of inner stiffeners positioned about an interior surface proximate to the pinhole orifice, wherein the plurality of inner stiffeners is configured to pool entrained beverage around the pinhole orifice.

17. The system of claim 12, wherein the one or more non-gaseous remediating components comprise one or more of:
    a flavor-enhancing additive;
    a citrus additive;
    a hop additive;
    an herb additive;
    salt; or
    baking soda.

18. The system of claim 12, wherein an interior surface of the cap comprises a reinforcement ring extending towards the bottom end of the cylindrical body, wherein the reinforcement ring contacts an exterior surface of the inner chamber to form an interference seal between the inner chamber and the outer chamber.

19. The system of claim 12, wherein the cap comprises a dome structure and is configured to orient towards a bottom of the packaged beverage such that the dome structure prevents obstruction of the pinhole orifice.

20. The system of claim 12, wherein the cartridge comprises a plurality of wing tabs that are configured to contact an interior surface of the packaged beverage and limit movement of the cartridge within the packaged beverage.

* * * * *